US007388875B1

(12) United States Patent
Lu

(10) Patent No.: US 7,388,875 B1
(45) Date of Patent: Jun. 17, 2008

(54) FANOUT UPGRADE FOR A SCALABLE SWITCHING NETWORK

(76) Inventor: Haw-minn Lu, 10733 Calston Way, San Diego, CA (US) 92126

( * ) Notice: Subject to any disclaimer, the term of this patent is extended or adjusted under 35 U.S.C. 154(b) by 57 days.

(21) Appl. No.: 11/456,501

(22) Filed: Jul. 10, 2006

Related U.S. Application Data

(63) Continuation of application No. 10/075,086, filed on Feb. 10, 2002, now Pat. No. 7,075,942.

(51) Int. Cl.
*H04L 12/28* (2006.01)
*H04L 12/56* (2006.01)
*H04L 12/66* (2006.01)
*G06F 15/173* (2006.01)

(52) U.S. Cl. .................. 370/419; 370/463; 709/242
(58) Field of Classification Search ........ 370/237, 370/238, 389, 392, 419, 463; 709/238–242
See application file for complete search history.

(56) References Cited

U.S. PATENT DOCUMENTS

| 5,841,775 | A | 11/1998 | Huang |
| 6,049,542 | A | 4/2000 | Prasad |
| 6,901,071 | B2 | 5/2005 | Lu |
| 7,075,942 | B2 * | 7/2006 | Lu ........................ 370/419 |
| 7,123,612 | B2 | 10/2006 | Lu |
| 2002/0004390 | A1 | 1/2002 | Cutaia et al. |
| 2003/0163754 | A1 | 8/2003 | Lu |

OTHER PUBLICATIONS

Cizek, et al. "Tradeoff Between Cost and Reliability in Packet Switching MultiStage Interconnection Networks," Africon '92 Proceedings., 3rd Africon Conference, Sep. 22-24, 1992, pp. 365-368, IEEE, South Africa (Reprinted US).

Agrawal, "Testing and Fault-Tolerance of Multistage Interconnection Networks," Computer, Apr. 1982, pp. 41-53, vol. 15, No. 4, IEEE, US.

Bhuyan, et al., "Design and Performance of Generalized Interconnection Networks," IEEE Transactions on Computers, Dec. 1983, pp. 1081-1090, vol. 32, No. 12, IEEE, US.

Blake, et al., "Multistage Interconnection Network Reliability," IEEE Transactions on Computers, Nov. 1989, pp. 1600-1603, vol. 38, No. 11, IEEE, US.

Chin, et al., "Packet Switching Networks for Multiprocessors and Data Flow Computers," IEEE Transactions on Computers, Nov. 1984, pp. 991-1003, vol. 33, No. 11, IEEE, US.

Kumar, et al., "Failure Dependent Performance Analysis of a Fault-Tolerant Multistage Interconnection Network," IEEE Transactions on Computers, Dec. 1989, pp. 1703-1713, vol. 38, No. 12, IEEE, US.

(Continued)

*Primary Examiner*—Ronald Abelson

(57) ABSTRACT

A redundant multistage network can be expanded by increasing the fanout of each router in a non-stop manner, involving a port addition, a reconfiguring and an activation section. The port addition section involves the addition of new ports to each switching element. The reconfiguring section involves the selection of a port and disconnecting any connections necessary to connect that port with its proper corresponding port as derived from the final desired topology. This section can further include the optional permutation of port address to minimize traffic disruption. The activation section involves attaching any new external ports to external sources and putting those new connections into service.

19 Claims, 27 Drawing Sheets

OTHER PUBLICATIONS

Tzeng, et al., "Realizing Fault-Tolerant Interconnection Network via Chaining," IEEE Transactions on Computers, Apr. 1988, pp. 458-462, vol. 37, No. 4, IEEE, US.

Varma, et al., "Fault-Tolerant Routing in Multistage Interconnection Networks," IEEE Transactions on Computers, Mar. 1989, pp. 385-393, vol. 38, No. 3, IEEE, US.

* cited by examiner

```
//
//Procedure Upgrade
//     Performs a fanout upgrade of a network.
//     "want to relabel" may be "true" or "false" each time the statement is reached
//
Procedure Upgrade
       do {
              select any router requiring addition of ports
              add_ports(router);
       } while (there are routers requiring new ports);
       do {
       start:
              if(want to relabel) {
                     if(any router, current_router, can be relabeled) {
                            relabel_ports(current_router);
                            goto start;
                     }
              }
              select any port not connected to corresponding_port(port);
              target_port=corresponding_port(port);
              if(target_port is already connected) {
                     disconnected_port=port currently connected to target_port;
                     Disconnect(target_port,disconnected_port);
              }
              Connect(port,target_port);
       } while(there are misconnected ports);
connect_external_ports();
activate_external_ports();
```

Fig. 7A

```
//
//Procedure Upgrade
//     Performs a fanout upgrade of an RCCBG network with an upgraded fanout of fanout,
//     num_routers_per_row per row, and num_rows total rows. Also,
//     RELABEL_AVAILABLE flag if swapping of ports in a single router can be performed without
//     breaking connections.
//
Procedure Upgrade
do {
      select any router requiring addition of ports
      add_ports(router);
} while (there are routers requiring new ports);

for(rindex=0;rindex<num_rows-1;rindex++) {
      current_row=row select(rindex);
      if(RELABEL_AVAILABLE) {
            relabel ports(current_row);
      }
      disconnected_port=None; // Holds the port previously disconnected by the last rewire step
      while((port=select_port(disconnected_port,current_row))!=None) {
            target_port=corresponding_port(port);
            if(target_port is already connected) {
                  disconnected_port=port currently connected to target_port;
                  Disconnect(target_port,disconnected_port);
            }
            Connect(port,target_port);
      }
}
connect_external_ports();
activate_external_ports();
```

Fig. 7B

```
//
//Simplification functions.
//
Function correct_port(port1,port2)
{
    if(port1 can be properly connect to port2)return(TRUE);
    else return(FALSE);
}
Function corresponding_port(port)
{
    if(port is a bottom port) {
        return top port of router in next row that should be properly connected to port port;
    } else {
        return bottom port of router in the previous row that should be properly connected to port port;
    }
}
Function Disconnect(port1,port2)
{
    Divert traffic away from port1 ;
    Divert traffic away from port2 ;
    Disconnect connection between port1 and port2 ;
}
Function Connect(port1,port2)
{
    Connect port1 and port2 ;
    Allow traffic to flow through port1 ;
    Allow traffic to flow through port2 ;
}
```

Fig. 7C

```
Function row_select(row_index) {
    if(num_rows is even) {
        start_row=num_rows/2-1;
    } else {
        start_row=(num_rows-1)/2;
    }
    if(row_index is even) {
        return(start_row+row_index/2);
    } else {
        return(start_row-(row_index+1)/2);
    }
}
```

Fig. 8A

```
Function row_select(row_index) {
    return(row_index);
}
```

Fig. 8B

```
Function select_port(dport,current_row) // optimal dport is not used
{
    port_pool={port: bottom ports of routers in row, current_row and top port of routers in row,
            current_row+1 not connected to corresponding_port(port)};
    // For simplicity order right to left
    // First criterion
    for port in port_pool {
        if(disconnected(port) && disconnected(corresponding_port(port)))return(port);
    }
    // Second criterion:This basically says we prefer to target connections that break
    // connections only on fully populated routers
    for port in port_pool {
        if(disconnected(port) &&
            num_disconnections(router_of(port_connected_to(corresponding_port(port))==0))) {
            return(port);
        }
    }
    // Third criterion:Any port that is not connected
    for port in port_pool {
        if(disconnected(port)) return(port);
    }
    // Catch all for any ports left over:Not likely to be needed
    for port in port_pool {
        return(port);
    }
    return(None);
}
```

Fig. 9A

```
Function select_port(dport,row) //fill the hole
{
    if(dport !=None)return(dport);
    else {
        for all bottom ports, port, of routers in row current_row scanning from right to left {
            if(port is not connected to corresponding_port(port)) return(port);
        }
        return None; // No more ports to rewire
    }
}
```

Fig. 9B

```
Function select_port(dport,current_row) // round robin
{
    // This requires a FIFO of ports
    if(port_fifo empty) {
        port_fifo={port: bottom ports of routers in row, current_row and top port of routers in row,
                    current_row+1 which are disconnected};
    if(port_pool empty) {
        port_pool={port: bottom ports of routers in row, current_row and top port of routers in row,
                    current_row+1 not connected to corresponding_port(port)};
        for port in port_pool {
            return(port);
        }
        // Catch all for any ports left over:Not likely to be needed
        port=any port not connected to proper port
        if(port exists) {
            return(port);
        }else {
            return(None);
        }
    }
    port=top of port_fifo ;
    remove top of port_fifo ;
    return(port);
}
```

Fig. 9C

```
Function relabel_ports(current_row)
{
    for(i=0;i<routers_per_row;i++) {
        for(bport1=0;bport1<fanout;bport1++) {
            for(bport2=0;bport2<fanout;bport2++) {
                //Test to see if the candidate port is connected to a router which one of the
                //other ports on the same router should be connected to.It doesn't matter
                //at this point if it is the correct top port.That will be corrected in next loop.
                if(bottom port bport1 of R(current_row,i)is connected to any top port of
                    router of(corresponding port(bottom port bport2 of R(current_row, i)) {
                    if(bport1!=bport2) {
                        exchange_ports(bport1 of R(current_row, i),bport2 of R(current_row, i));
                    }
                }
            }
        }
    }
    for(tport1=0;tport1<fanout;tport1++) {
        for(tport2=0;tport2<fanout;tport2++) {
            //Test to see if the candidate port is connected to a port which one of the
            //other ports on the same router should be connected to.
            if(top port tport1 of R(current_row+1, i)is connected to
                corresponding_port(top port tport2 of R(current_row+1, i)) {
                if(tport1!=tport2) {
                    exchange_ports(tport1 of R(current_row+1, i),tport2 of R(current_row+1, i));
                }
            }
        }
    }
}
//
//Auxiliary Procedures
//
Function router_of(port)
{
    return(the router which port belongs to);
}
//
//Here logical relabelling is assumed possible
//Other exchange schemes can be substituted
//
Function exchange_ports(port1,port2)
{
    permanently divert traffic originally intended for port1 to port2 ;
    permanently divert traffic originally intended for port2 to port1 ;
}
```

Fig. 10

FANOUT UPGRADE FOR A SCALABLE SWITCHING NETWORK

CROSS-REFERENCE TO RELATED APPLICATION

The present patent application is a continuation of U.S. Pat. No. 7,075,942 entitled "Fanout Upgrade for a Scalable Switching Network", issued on Jul. 11, 2006, which is incorporated herein by reference in its entirety.

BACKGROUND OF THE INVENTION

1. Field of Invention

This invention relates to redundant multistage switching networks, specifically to the non-stop addition of new ports to all routers of each row of such a network.

2. Description of Related Art

Many multistage switching networks are defined primarily as binary based. Some of these networks have been generalized for arbitrary fanouts.

FIG. 1A shows an 8-port binary Banyan network. Banyan networks are an example of multistage switching networks that have been generalized to arbitrary fanouts. FIG. 1B shows a 27-port ternary Banyan network. Both examples have the same number of rows.

There is no known investigation of the process of upgrading the fanout of Banyan networks. There are two likely reasons why such an upgrade path is undesirable. First, most implementations of switching networks using the Banyan architecture employ specific binary sorting algorithms to route traffic. Second, an upgrade of an n-stage $2^{n+1}$-port binary network to an n-stage $2 \times 3^n$-port ternary network or n-stage $2 \times 4^n$-port quaternary network would entail an exponential growth in number of ports required. From the examples already shown, this is a very large number even for the small numbers considered here.

OBJECTS AND ADVANTAGES

Accordingly, the several objects and advantages of my invention are:

(a) to provide a procedure by which a redundant multistage switching network can be upgraded by expanding the number of ports per router without having to break an external connection; and
(b) to provide a procedure by which a redundant multistage switching network can be upgraded by expanding the number of ports per router with a minimum loss in throughput bandwidth.

Further objects and advantages of my invention will become apparent from a consideration of the drawings and ensuing description.

adding a connection between top port 0 of R(2,3) and bottom port 3 of R(1,0), respectively.

FIG. 7A, FIG. 7B and FIG. 7C show the algorithm for expanding the fanout of the component routers of a compensated cyclic group multistage switching network, FIG. 7A shows the most general algorithm, while FIG. 7B shows a more specific algorithm.

FIG. 8A and FIG. 8B show two different algorithms for selecting the order the interconnections should be rewired.

FIG. 9A, FIG. 9B, and FIG. 9C show three different algorithms for selecting which port to rewire during the rewiring phase.

FIG. 10 shows an algorithm for relabeling ports to improve the efficiency of the upgrade process.

Figure 11:
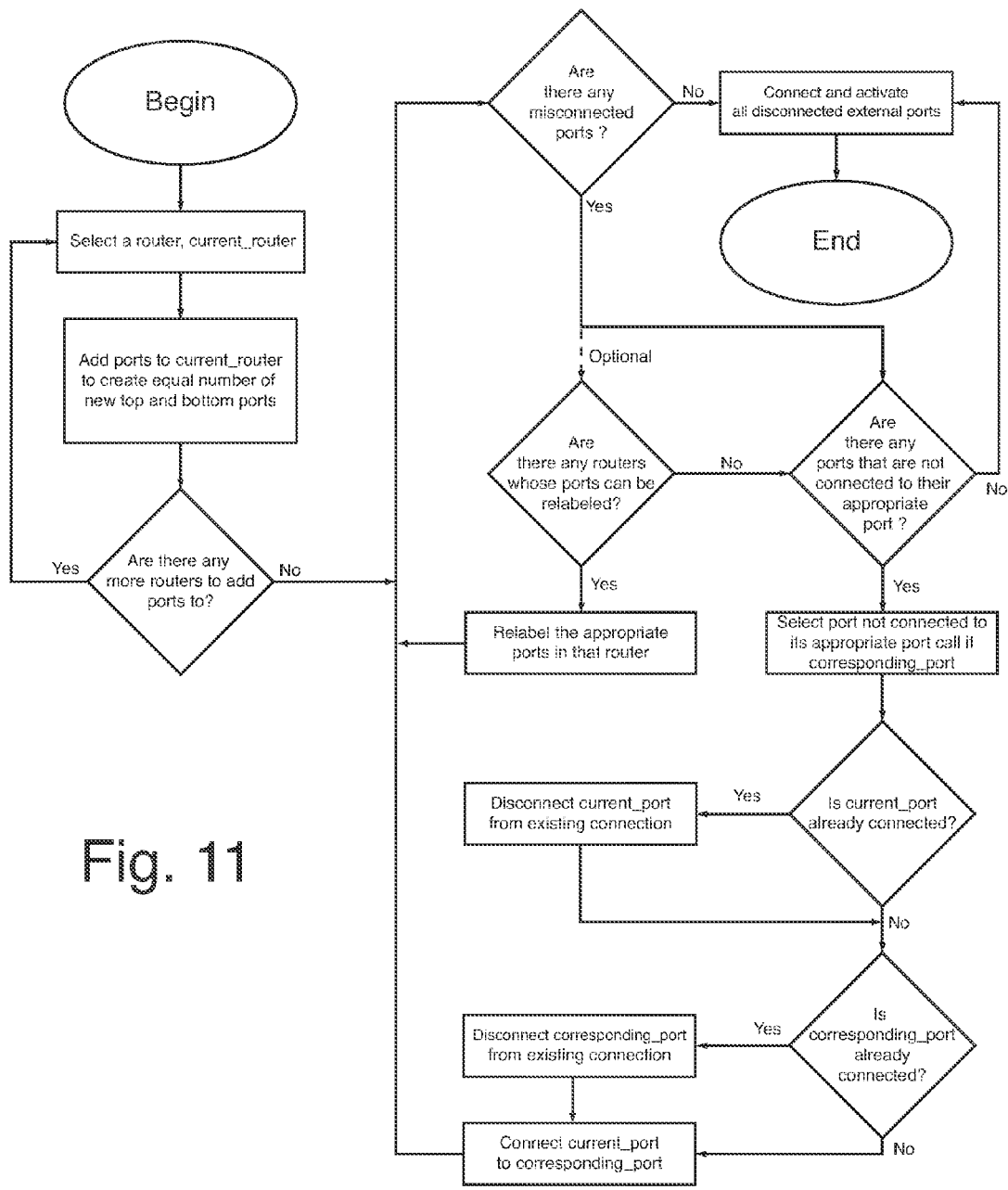

FIG. 11 shows the flowchart for the fanout upgrade algorithm shown in FIG. 7A and FIG. 7C.

Figure 12:
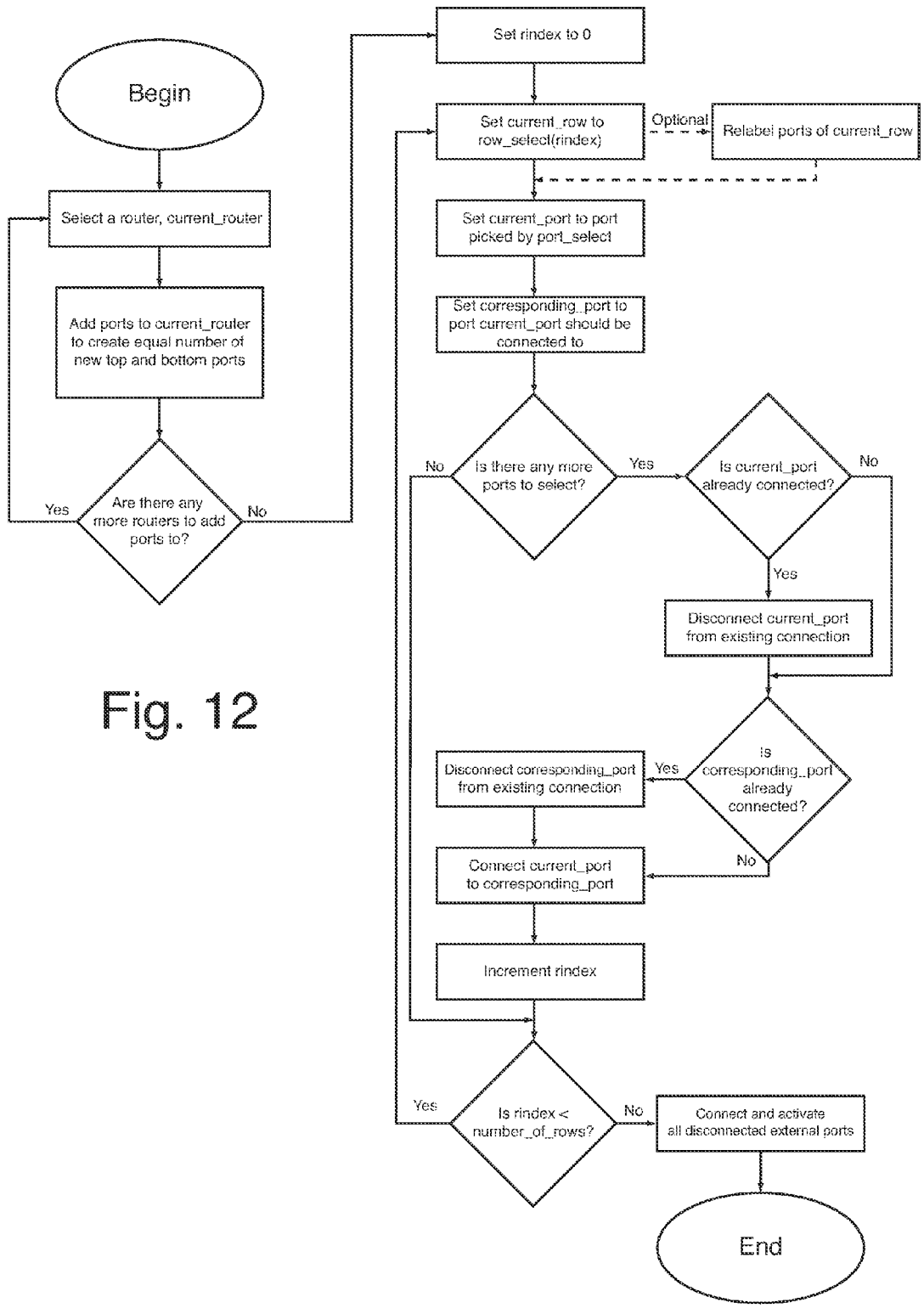

FIG. 12 shows the flowchart for the fanout upgrade algorithm shown in FIG. 7B and FIG. 7C.

Figure 13A:
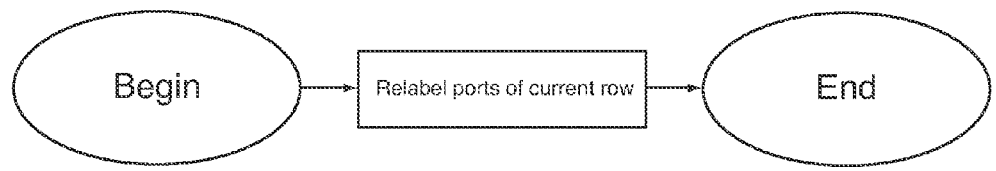
Figure 13B:
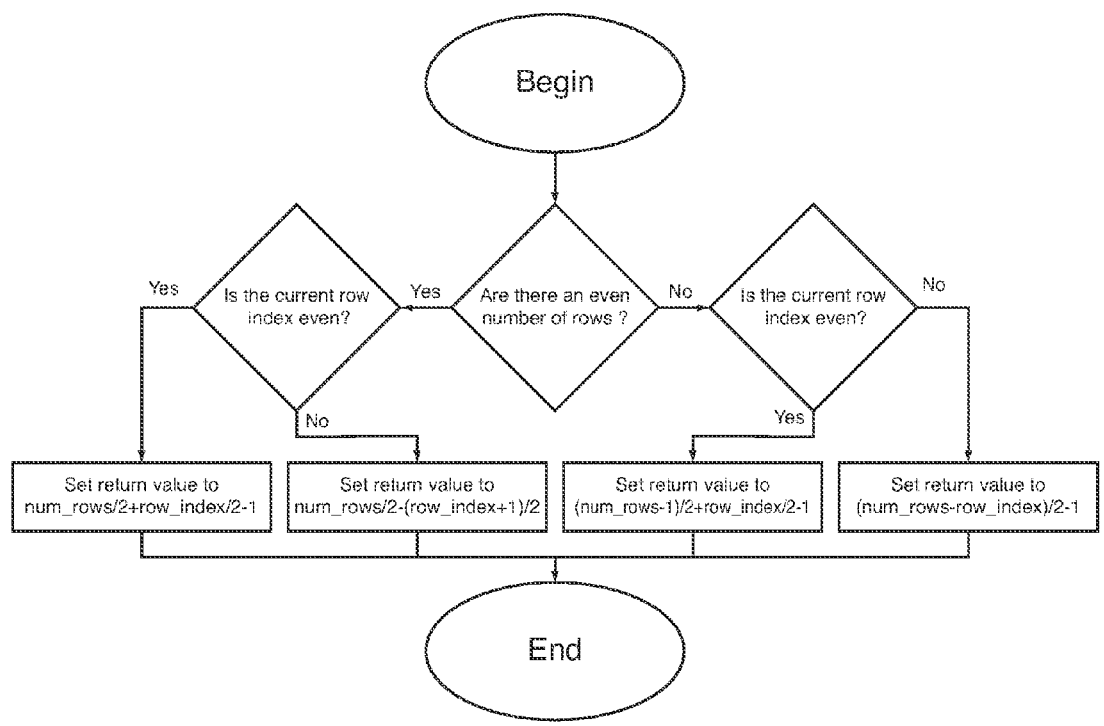

FIG. 13A and FIG. 13B show the flowcharts for the row selection algorithms shown in FIG. 8A and FIG. 8B respectively.

Figure 14A:
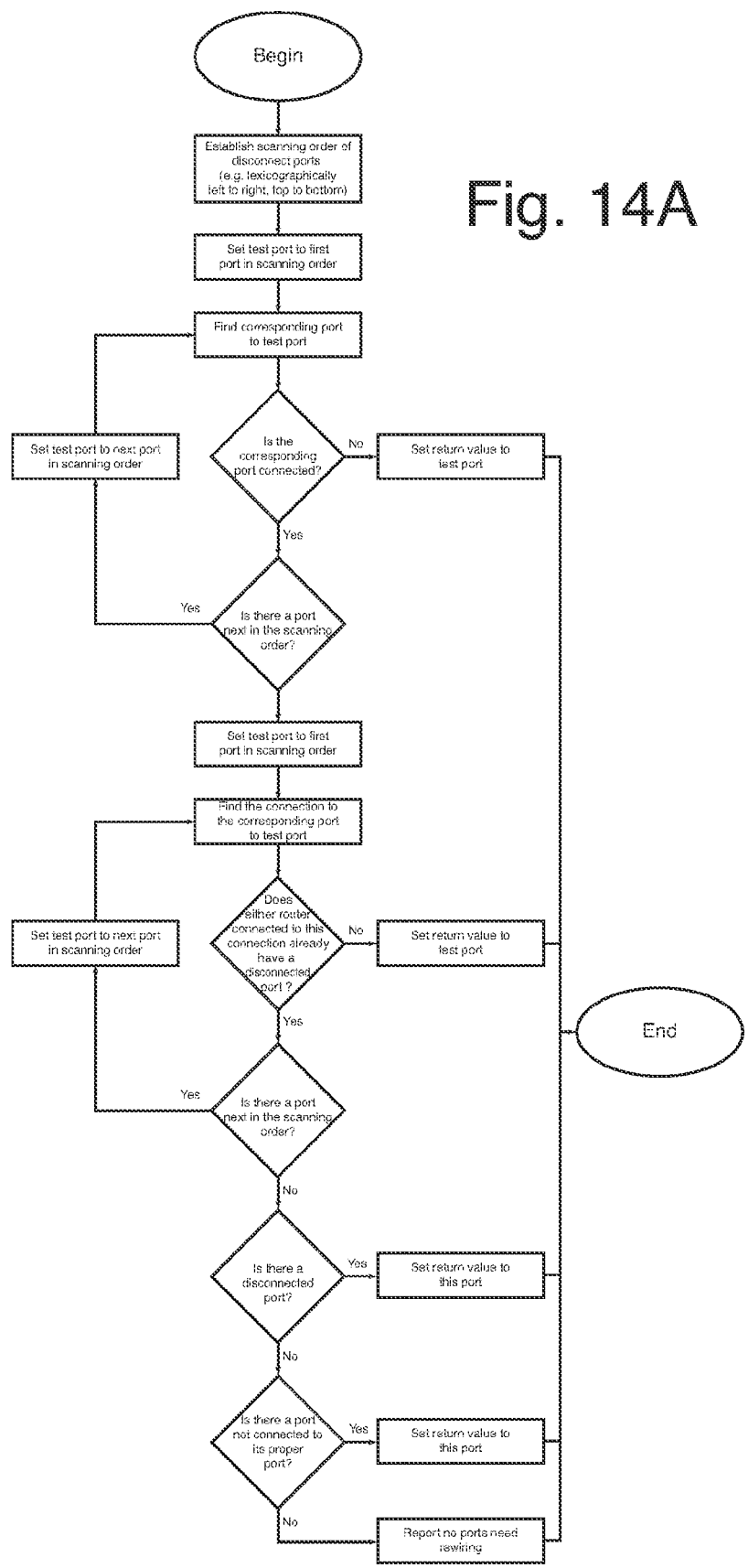
Figure 14B:
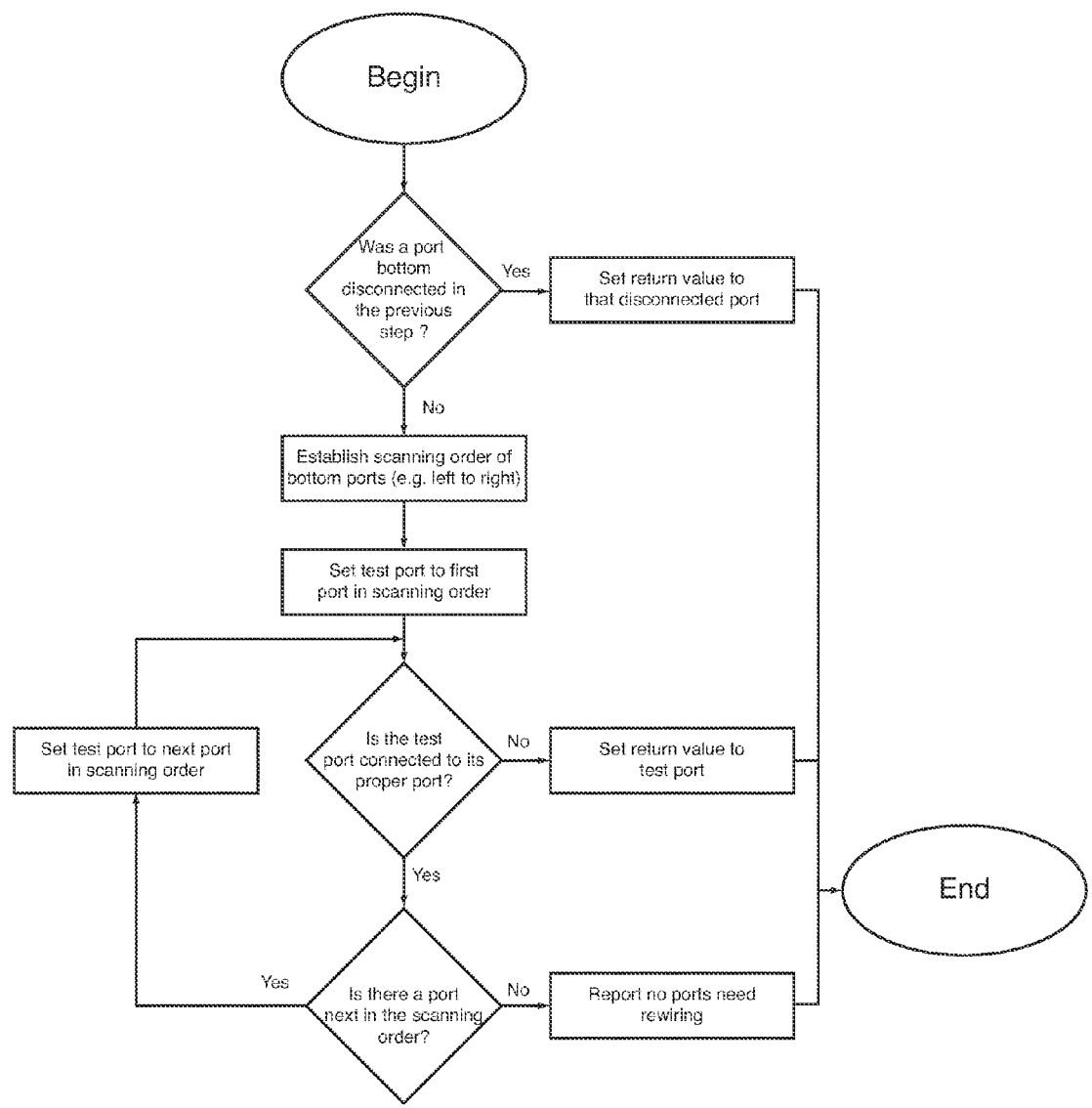
Figure 14C:
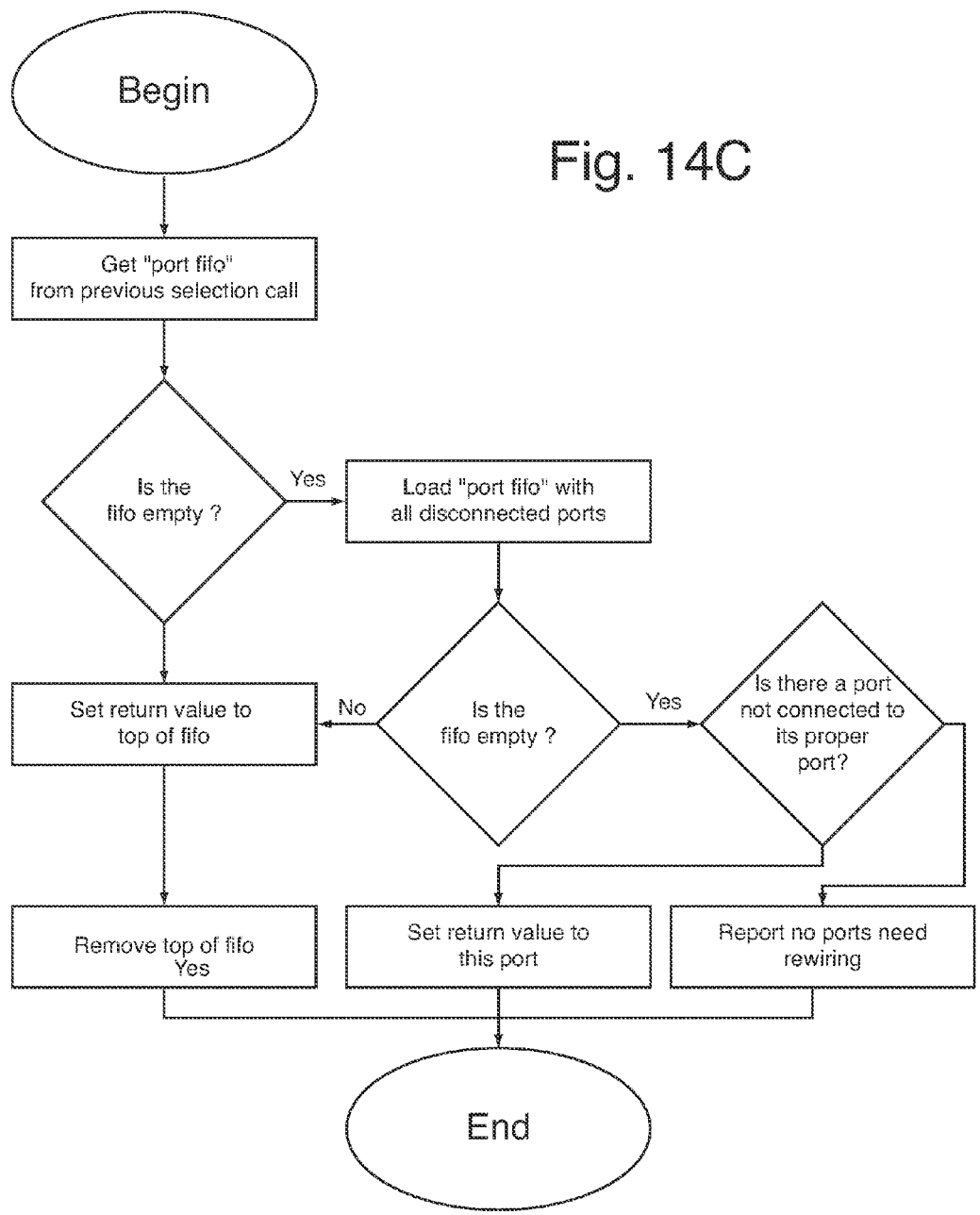

FIG. 14A, FIG. 14B and FIG. 14C show the flowcharts for the port selection algorithms shown in FIG. 9A, FIG. 9B and FIG. 9C, respectively.

Figure 15:
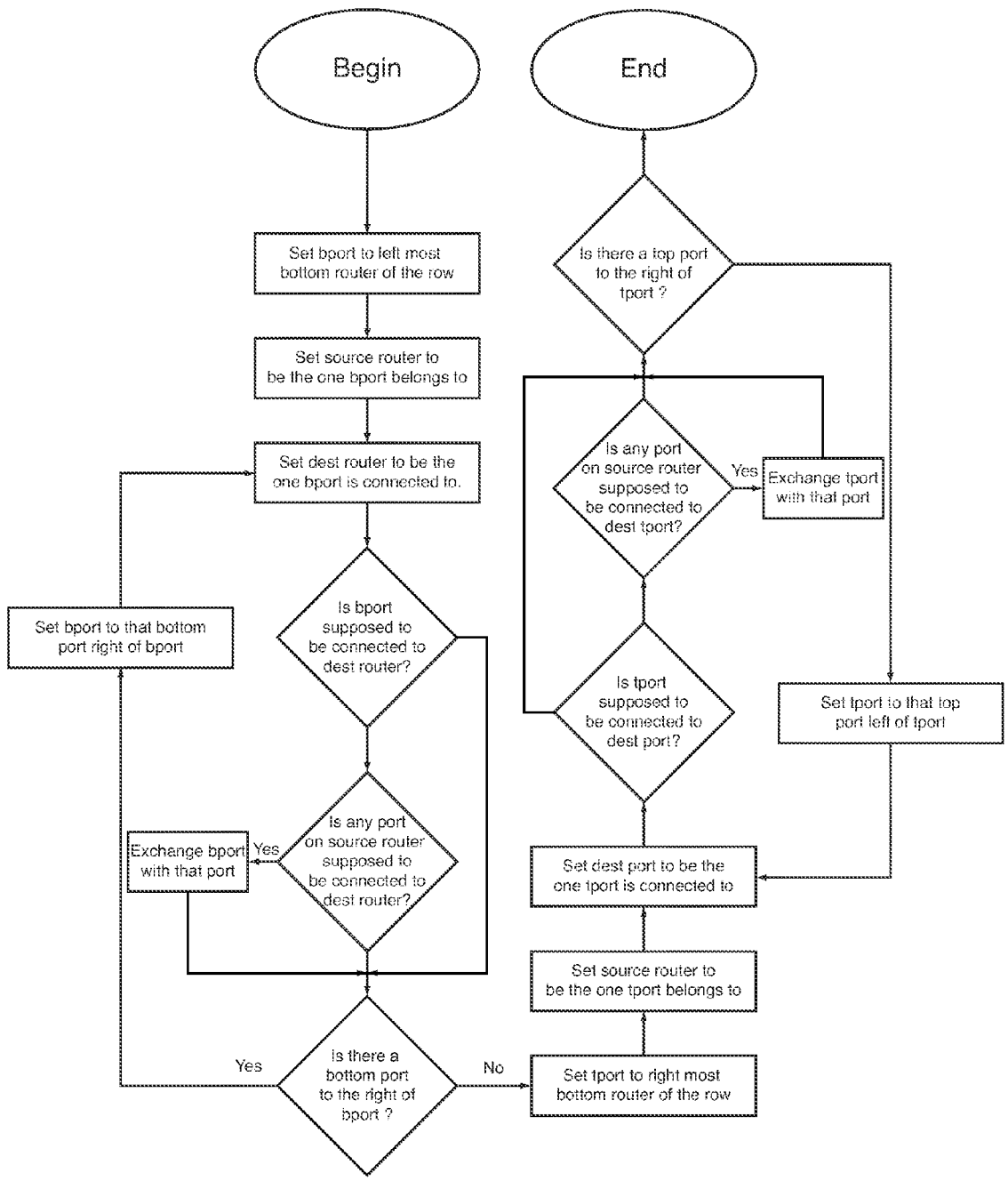

FIG. 15 shows flowchart for the relabeling algorithm shown in FIG. 10.

SUMMARY OF INVENTION

A multistage switching network can be expanded by adding ports to existing switching elements without breaking any external connections.

If the switching elements are routers or have the ability to route traffic the expansion may be performed without severely disrupting its ability to route traffic, provided that the routers themselves have the capability of having ports added while still in operation. Any number of ports may be added in any position as long as there are is an equal number added to both top and bottom ports. In general, these ports must be reassigned logically so the position of the new ports is irrelevant.

The fanout upgrade process has three constituent components. The first component is to install new line cards to provide each router with new ports.

The second component has two types of steps of which one is optional. The first type is to select a port that is misconnected in reference to the desired topology and to rewire it to its appropriate counterpart. The second type is optional and is the permutation of ports on the same router which results in a correct port being connected to the correct router. If such a permutation can be performed logically, traffic need not be disrupted. These two types of steps are repeated in any order until the desired topology is achieved. Since the ordering of such steps can be arbitrary, more structure can be added by breaking this component into three sub components.

The first subcomponent is the selection of the order in which each interconnection network is rewired into the desired topology. The order can be arbitrary, however, since the path redundancy is greatest in the middle of the network, the best order has been found to start with the middle row or the closest to the middle. The subsequent rows should be ordered with those closest to the middle first and those farthest away from the middle last.

The second subcomponent, which is optional, is the permutation of ports described above. This step should always be taken before rewiring an interconnection network, if such a permutation can be performed logically so that no traffic disruption occurs. This step minimizes bandwidth reduction during the rewiring of an interconnection network.

The third subcomponent is the rewiring phase. This is accomplished by systematically disconnecting from a selected port any misconnected connection to that port and to the corresponding port to which the selected port is to be connected. With any misconnections disconnected, the selected port and its appropriate corresponding port may then be connected. In order to minimize the impact on the throughput bandwidth, priority in the port selection process should be given to selecting ports not currently connected. This introduces a plethora of port selection algorithms. Additional preferences, contribute to better throughput bandwidth during the upgrade process.

The final component is relatively simple. All external connections that are not already connected should be connected and placed into service.

DESCRIPTION OF INVENTION

Figure 1A:
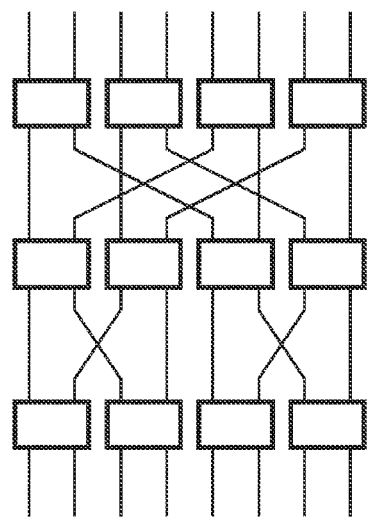
FIG. 1A shows a 16 port binary Banyan multistage switching network with three rows. (prior art)
Figure 1B:
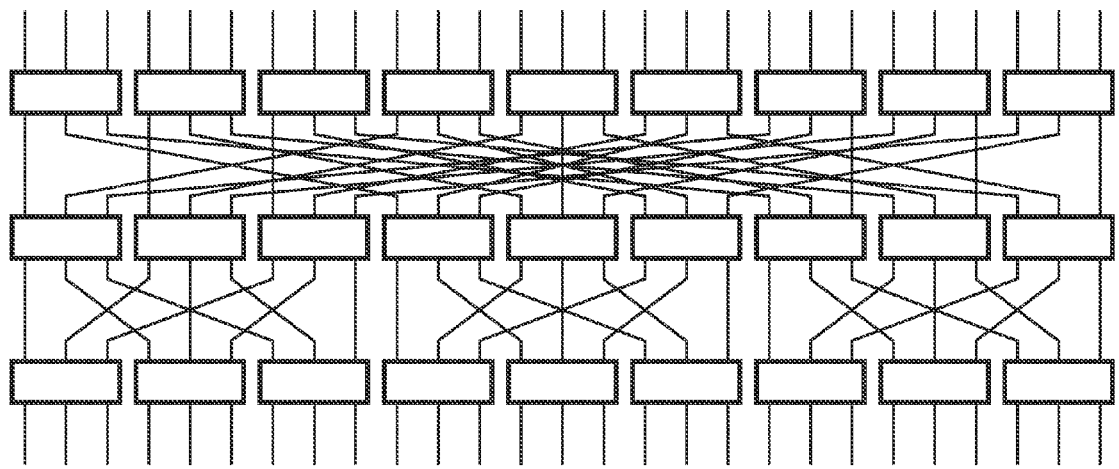
FIG. 1B shows a 54 port ternary Banyan multistage switching network with three rows. (prior art)
Figure 2:
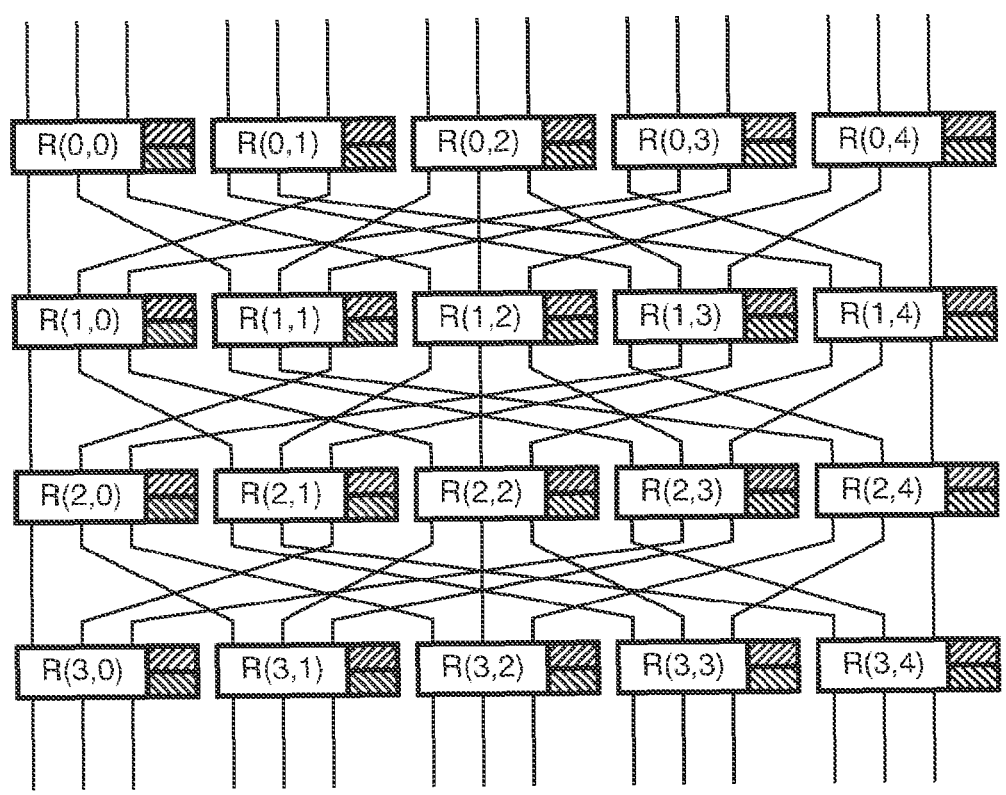
FIG. 2 shows a 30 port redundant blocking compensated cyclic group (RBCCG) multistage switching network. Hashed areas represent slots for adding ports. (prior art)

A redundant blocking compensated cyclic group (RB-CCG) multistage network, is shown in FIG. 2 and discussed further in U.S. Pat. No. 5,841,775, "Scalable Switching Networks" by Alan Huang, Nov. 24, 1998. It consists of rows of routers or other switching elements. These rows of routers are connected together via interconnection networks. The routers are designated R(row, column) where the top left most router is denoted R(0,0). The top ports of each router are numbered from left to right starting with 0. The bottom ports of each router are numbered from left to right starting with 0. The top ports of each interconnection network are numbered from left to right starting with 0. The bottom ports of each interconnection network are numbered from left to right starting with 0.

Figure 3A:
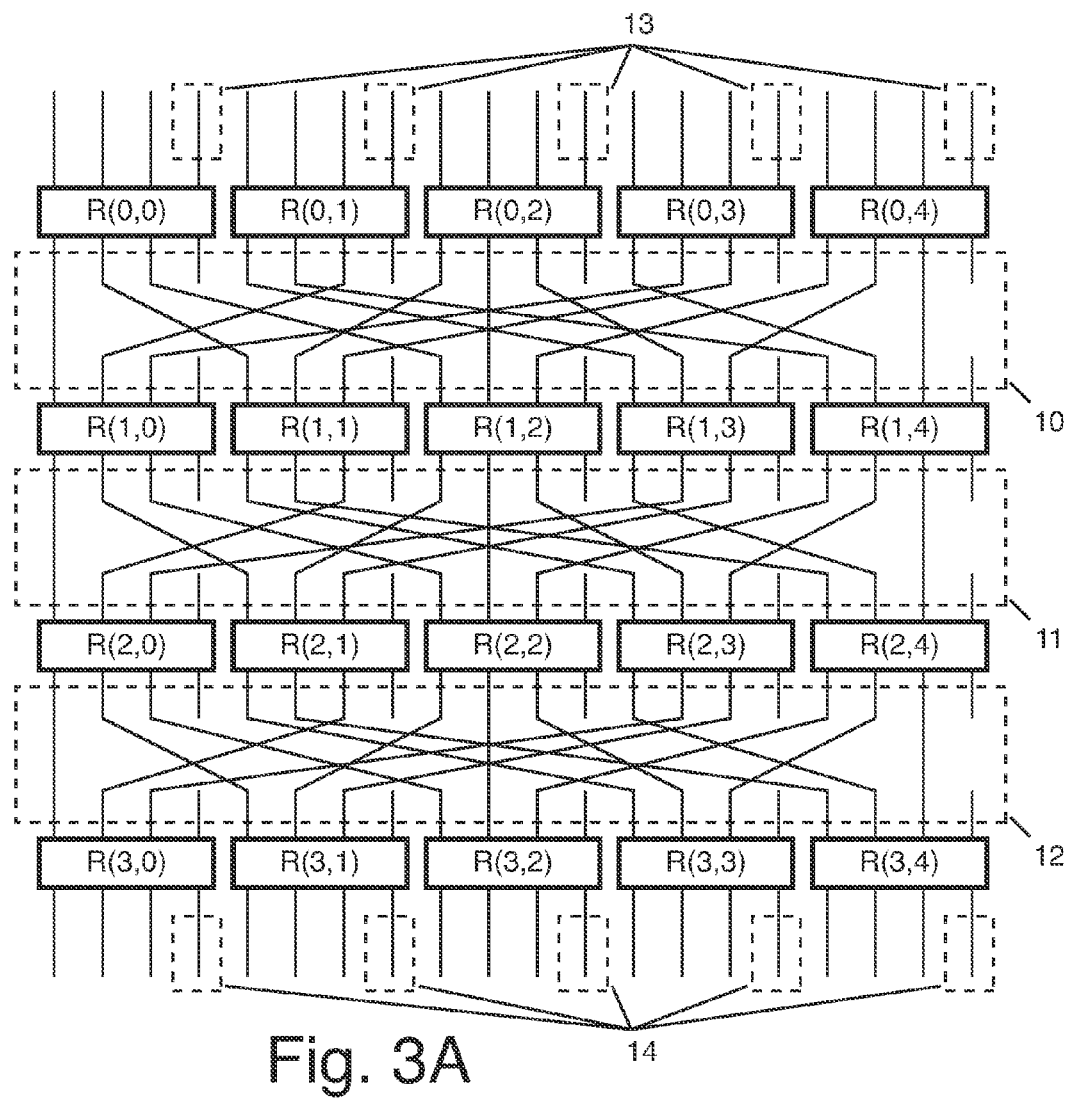
FIG. 3A shows a 30 port RBCCG multistage switching network where all routers have been augmented by 2 ports each, resulting in a 40 port switching network.
Figure 3B:
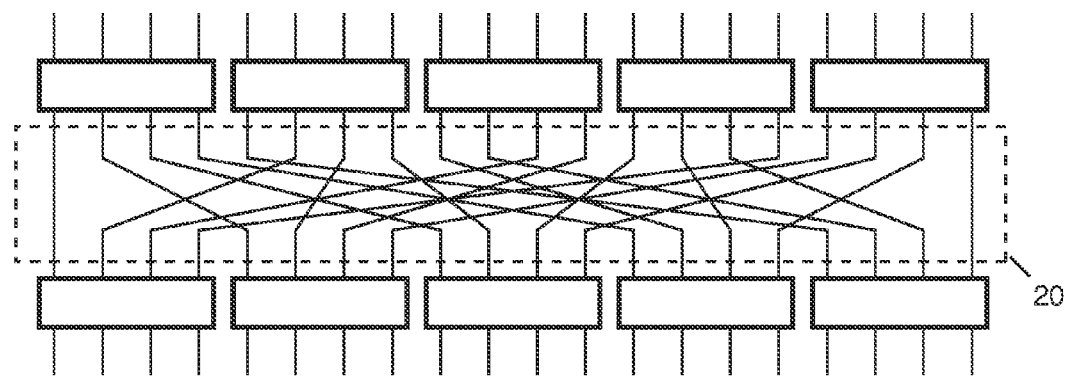
FIG. 3B shows a section of a 40-port RBCCG multistage switching network with the proper interconnection network between two rows of routers.

This method applies routers or switching elements for which ports may added without having to shutdown the router. In FIG. 2, the hatched areas on each router indicate potential insertion points for new ports. Typically, routers are expanded by the addition of new line cards. Insertion of a new line card may add more than a single port. In general, many ports can be added using the methods described here. In addition, a single line card with two or more ports may be installed to provide both additional top and bottom ports to a router. For the purposes here, the method is applied to the expansion of a single top port and a single bottom port for each router, as shown in FIG. 3A. With the new ports added, interconnection networks 10, 11, and 12 need to be rewired to look like interconnection network 20 as shown in FIG. 3B.

The most general form of the upgrade process is given by FIG. 7A, with supporting functions given in FIG. 7C, and flowcharted in FIG. 11. The first major step is to add the desired new ports to each routers. This is depicted in FIG. 7A and FIG. 11 with a algorithmic loop. Though no specific order is given for which the routers are augmented, they may be augmented in any order. No particular order has any advantage in terms of minimizing traffic disruption or number of steps. The choice may come down to which is physically more convenient.

The upgrade process continues after the ports are added by selecting any port which is misconnected with respect to the desired final topology. The order of selection does have an impact on the disruption of traffic and even the number of total steps. A more systematic and organized approach is given below in a refinement of this algorithm. Once a port is selected it is rewired by connecting it to its appropriate port with respect to the final topology. Henceforth, this port will be known as its corresponding port. The remainder of the algorithm in FIG. 7A and flowchart FIG. 11 is a detailed description of the rewiring based on the connection states of the port and its corresponding port.

There is also an optional branch in the upgrade process. In scanning the routers, one may discover routers for which some connections originate from the correct routers (with respect to the desired final topology) but connect to the wrong port. If a logical reassignment of port addresses were possible, achieving a virtual port permutation while leaving the physical connections unchanged. This would reduce the number of connections that need to be broken. This step, as indicated by the optional branch, may be executed at any time, that is it need not be executed in every loop of the algorithm. For instance, the sequence could be rewire, relabel, relabel, relabel, rewire, rewire, relabel, rewire, etc. A more systematic approach is given in a refined version of the upgrade algorithm.

The final step in this process is to connect and activate any new external ports that result from the addition of new ports in this upgrade process.

The upgrade process is refined in FIG. 7B with flowchart in FIG. 12. The first part with depicting the port addition and the last step involving the activation of new external ports are the same as the more general algorithm. The distinction is that the rewiring and the optional relabeling is made more systematic. The first refinement is that the process takes place row by row or more precisely interconnection network by interconnection network. This is illustrated by the creation of the "row_select" component. Once a row is selected the optional "relabel_ports" component my be executed for that row. After that, a port that is part of the selected interconnection network, by convention the interconnection network below the selected row, is selected by the "select_port" component and rewired to its corresponding port. These three component algorithms are given in more detail below.

In the examples given below, the process of "diverting traffic" away from a port and "stop diverting traffic" from a port (also called "allow traffic to flow" to a port as stated in FIG. 9C.) should occur automatically whenever a connection is broken (disconnected) and when a connection is established, respectively, if the routers are running standard routing protocols such as OSPF. However, the disconnection process may be streamlined by forcing new routing table information to be the routers prior to the connection being broken, thereby speeding the upgrade process and minimizing the impact on traffic. Likewise, a forced change to the routing table may expedite the full use of bandwidth after a new connection is established. In addition, to streamline the notation in the flowcharts, FIG. 14 and FIG. 15, the act of disconnection also implies the diversion of traffic from its attached ports prior to the breaking of the connection. Also, the act of connecting two ports implies the allowing of new traffic flow through the two ports (or equivalently the "stopping of the diversion of traffic" from the two ports) after the attachment of a connection between the two ports.

The "row_select" algorithms selects a sequencing of the interconnections between rows. Each interconnection shall be called by the row number, whose bottom ports the interconnections are attached to. This sequence must include all the interconnections, but may be in any order. FIG. 8A shows the best "row_select" algorithm. FIG. 8B shows another common "row_select" algorithm. FIG. 13A and FIG. 13B show the respective flowcharts.

There is an optional relabel_ports stage, which will be described later. The remaining component of the "upgrade" algorithm is the "select_port" port algorithm. During the rewiring of each interconnection network, the basic "upgrade" algorithm calls for the selection of any port, top or bottom not properly connected to it's appropriate corresponding port in accordance with 20 of FIG. 3B. Though any port may be selected at each step, it has been found that priority should be given to ports that are not already connected. If a port that is already connected is selected, it may introduce an additional disconnection resulting in degradation of throughput bandwidth. FIG. 9A, FIG. 9B and FIG. 9C show three common "select_port" algorithms. Corresponding flowcharts are shown in FIG. 14A, FIG. 14B, and FIG. 14C.

Though there are many possible combinations of upgrading, even based on the two "row_select" algorithms, and three "select_port" algorithms already described here. The best combination is described in detail, employing the algorithm in FIG. 8A for the row selection and the algorithm in FIG. 9A for port selection. Since all three interconnections, 10, 11, and 12 of FIG. 3A are identical, the rewiring is shown only in detail for the first iteration of rewiring.

Figure 4A:
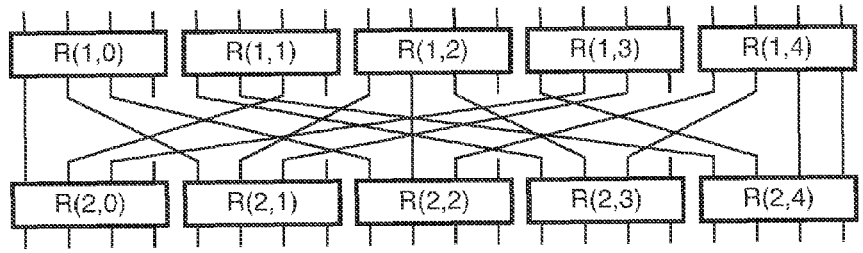
FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L, FIG. 4M, FIG. 4N, FIG. 4O, and FIG. 4P show the connections between router rows R(1,*) and R(2,*) being rewired into a 40 port RBCCG multistage switching network interconnection by adding a connection between bottom port 3 of R(1,4) and top port 3 of R(2,4); adding a connection between bottom port 3 of R(1,3) and top port 3 of R(2,0); moving the connection from top port 2 of R(2,4) to top port 3 of R(2,3); moving the connection from top port 2 of R(2,3) to top port 3 of R(2,2); moving the connection from top port 2 of R(2,0) to top port 2 of R(2,3); moving the connection from top port 2 of R(2,2) to top port 3 of R(2,1); moving the connection from top port 2 of R(2,1) to top port 2 of R(2,4); adding a connection between bottom port 3 of R(1,2) and top port 2 of R(2,1); moving the connection from top port 1 of R(2,4) to top port 2 of R(2,2); moving the connection from top port 1 of R(2,2) to top port 1 of R(2,4); adding a connection between top port 1 of R(2,2) and bottom port 3 of R(1,1); moving the connection from bottom port 0 of R(1,1) to bottom port 3 of R(1,0); moving the connection from top port 1 of R(2,3) to top port 2 of R(2,0); moving the connection from top port 1 of R(2,1) to top port 1 of R(2,3); moving the connection from top port 1 of R(2,0) to top port 1 of R(2,1); moving the connection from bottom port 1 of R(1,1) to bottom port 0 of R(1,1), respectively.

The process begins by selecting bottom port 3 of R(1,4) because scanning from right to left, it is the first port bottom or top not connected to anything and whose corresponding port (according to FIG. 3B) is also not connected to anything; establishing a new connection between bottom port 3 of R(1,4) and top port 3 of R(2,4) as shown in FIG. 4A; starting bottom port 3 of R(1,4) and top port 3 of R(2,4); and stop diverting the traffic from bottom port 3 of R(1,4) and top port 3 of R(2,4).

Figure 4B:
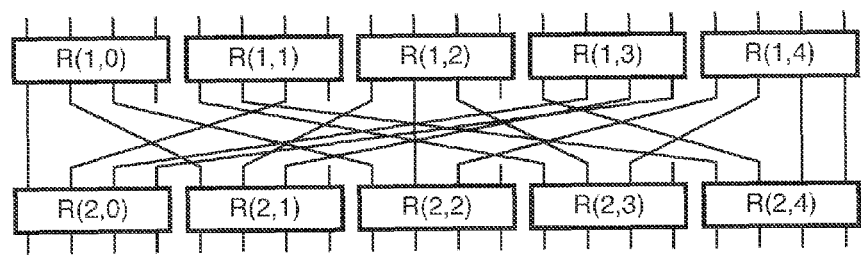

The process continues by selecting bottom port 3 of R(1,3) because scanning from right to left, it is the first port bottom or top not connected to anything and whose corresponding port (according to FIG. 3B) is also not connected to anything; establishing a new connection between bottom port 3 of R(1,3) and top port 3 of R(2,0) as shown in FIG. 4B; starting bottom port 3 of R(1,3) and top port 3 of R(2,0); and stop diverting the traffic from bottom port 3 of R(1,3) and top port 3 of R(2,0).

Scanning from right to left, no port, top or bottom, has a corresponding port which is not connected. Again, scanning from right to left, top port 3 of R(2,3) is not connected to anything with corresponding port according to FIG. 3B, bottom port 2 of R(1,4). Bottom port 2 of R(1,4) is currently connected to top port 2 of R(2,4). The breaking of this connection does not leave router R(1,4) or router R(2,4) with more than one broken connection. This completes the selection process for this step.

Figure 4C:
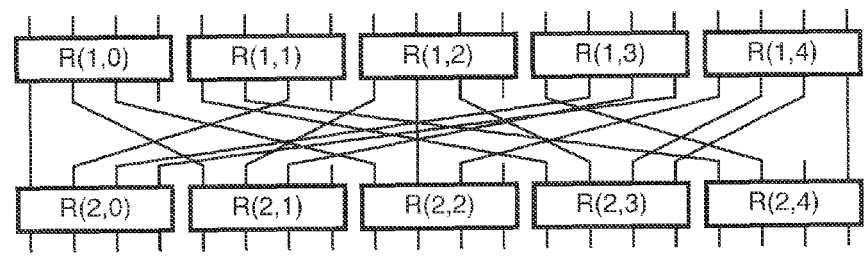

With top port 3 of R(2,3) selected and recalling that its corresponding port, bottom port 2 of R(1,4), is connected to top port 2 of R(2,4), the process continues by diverting traffic from bottom port 2 of R(1,4) and top port 2 of R(2,4); stopping bottom port 2 of R(1,4) and top port 2 of R(2,4); disconnecting bottom port 2 of R(1,4) and top port 2 of R(2,4) and moving the disconnected connection to top port 3 of R(2,3) as shown in FIG. 4C; starting top port 3 of R(2,3) and bottom port 2 of R(1,4); and stop diverting the traffic from top port 3 of R(2,3) and bottom port 2 of R(1,4).

Scanning from right to left, no port, top or bottom, has a corresponding port which is not connected. Again, scanning from right to left, top port 2 of R(2,4) is not connected to anything with corresponding port according to FIG. 3B, bottom port 2 of R(1,3). Bottom port 2 of R(1,3) is currently connected to top port 2 of R(2,1). The breaking this connection introduces a second broken connection to R(2,1), so top port 2 of R(2,4) is not selected. Continuing to scan from right to left, bottom port 3 of R(1,2) is not connected to anything with corresponding port according to FIG. 3B, top port 2 of R(2, 1). Top port 2 of R(2, 1) is currently connected to bottom port 2 of R(1,3). The breaking this connection introduces a second broken connection to R(2,1), so bottom port 3 of R(1,2) is not selected. Continuing to scan from right to left, top port 3 of R(2,2) is not connected to anything with corresponding port according to FIG. 3B, bottom port 1 of R(1,4). Bottom port 1 of R(1,4) is currently connected to top port 2 of R(2,3). The breaking of this connection does not leave router R(1,4) or router R(2,3) with more than one broken connection. This completes the selection process for this step.

Figure 4D:
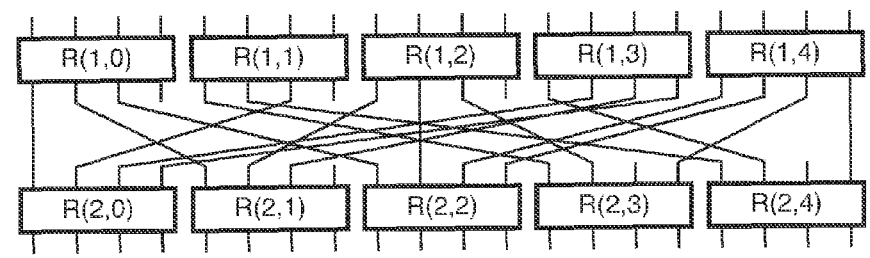

With top port 3 of R(2,2) selected and recalling that its corresponding port, bottom port 1 of R(1,4), is connected to top port 2 of R(2,3), the process continues by diverting traffic from bottom port 1 of R(1,4) and top port 2 of R(2,3); stopping bottom port 1 of R(1,4) and top port 2 of R(2,3); disconnecting bottom port 1 of R(1,4) and top port 2 of R(2,3) and moving the disconnected connection to top port 3 of R(2,2) as shown in FIG. 4D; starting top port 3 of R(2,2) and bottom port 1 of R(1,4); and stop diverting the traffic from top port 3 of R(2,2) and bottom port 1 of R(1,4).

Scanning from right to left, no port, top or bottom, has a corresponding port which is not connected. Again, scanning from right to left, top port 2 of R(2,4) is not connected to anything with corresponding port according to FIG. 3B, bottom port 2 of R(1,3). Bottom port 2 of R(1,3) is currently connected to top port 2 of R(2,1). The breaking this connection introduces a second broken connection to R(2,1), so top port 2 of R(2,4) is not selected. Continuing to scan from right to left, top port 2 of R(2,3) is not connected to anything with corresponding port according to FIG. 3B, bottom port 1 of R(1,3). Bottom port 1 of R(1,3) is currently connected to top port 2 of R(2,0). The breaking of this connection does not leave router R(1,3) or router R(2,0) with more than one broken connection. This completes the selection process for this step.

Figure 4E:
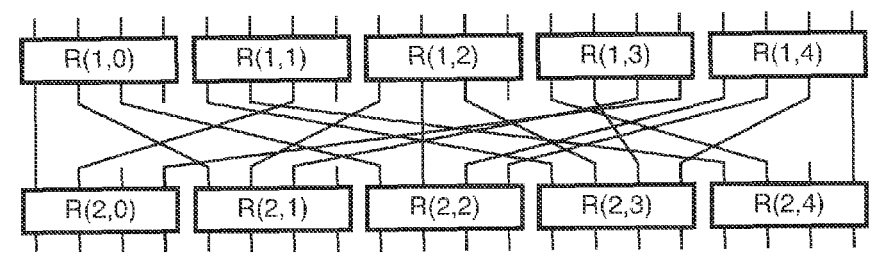

With top port 2 of R(2,3) selected and recalling that its corresponding port, bottom port 1 of R(1,3), is connected to top port 2 of R(2,0), the process continues by diverting traffic from bottom port 1 of R(1,3) and top port 2 of R(2,0); stopping bottom port 1 of R(1,3) and top port 2 of R(2,0); disconnecting bottom port 1 of R(1,3) and top port 2 of R(2,0) and moving the disconnected connection to top port 2 of R(2,3) as shown in FIG. 4E; starting top port 2 of R(2,3) and bottom port 1 of R(1,3); and stop diverting the traffic from top port 2 of R(2,3) and bottom port 1 of R(1,3).

Scanning from right to left, no port, top or bottom, has a corresponding port which is not connected. Again, scanning from right to left, top port 2 of R(2,4) is not connected to anything with corresponding port according to FIG. 3B, bottom port 2 of R(1,3). Bottom port 2 of R(1,3) is currently connected to top port 2 of R(2,1). The breaking this connection introduces a second broken connection to R(2,1), so top port 2 of R(2,4) is not selected. Continuing to scan from right to left, bottom port 3 of R(1,2) is not connected to anything with corresponding port according to FIG. 3B, top port 2 of R(2, 1). Top port 2 of R(2, 1) is currently connected to bottom port 2 of R(1,3). The breaking this connection introduces a second broken connection to R(2,1), so bottom port 3 of R(1,2) is not selected. Continuing to scan from right to left, bottom port 3 of R(1,1) is not connected to anything with corresponding port according to FIG. 3B, top port 1 of R(2,2). Top port 1 of R(2,2) is currently connected to bottom port 1 of R(1,2). The breaking this connection introduces a second broken connection to R(1,2), so bottom port 3 of R(1,1) is not selected. Continuing to scan from right to left, top port 3 of R(2,1) is not connected to anything with corresponding port according to FIG. 3B, bottom port 0 of R(1,4). Bottom port 0 of R(1,4) is currently connected to top port 2 of R(2,2). The breaking of this connection does not leave router R(1,4) or router R(2,2) with more than one broken connection. This completes the selection process for this step.

Figure 4F:
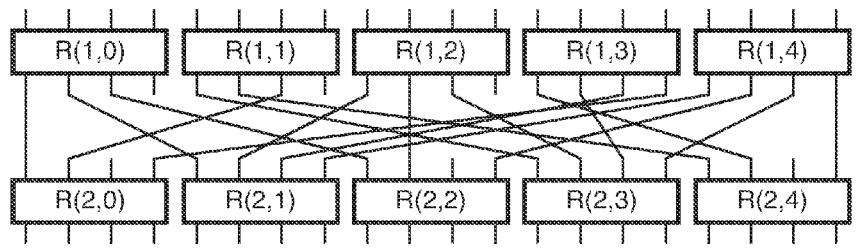

With top port 3 of R(2,1) selected and recalling that its corresponding port, bottom port 0 of R(1,4), is connected to top port 2 of R(2,2), the process continues by diverting traffic from bottom port 0 of R(1,4) and top port 2 of R(2,2); stopping bottom port 0 of R(1,4) and top port 2 of R(2,2); disconnecting bottom port 0 of R(1,4) and top port 2 of R(2,2) and moving the disconnected connection to top port 3 of R(2,1) as shown in FIG. 4F; starting top port 3 of R(2,1) and bottom port 0 of R(1,4); and stop diverting the traffic from top port 3 of R(2,1) and bottom port 0 of R(1,4).

Scanning from right to left, no port, top or bottom, has a corresponding port which is not connected. Again, scanning from right to left, top port 2 of R(2,4) is not connected to anything with corresponding port according to FIG. 3B, bottom port 2 of R(1,3). Bottom port 2 of R(1,3) is currently connected to top port 2 of R(2,1). The breaking of this connection does not leave router R(1,3) or router R(2, 1) with more than one broken connection. This completes the selection process for this step.

Figure 4G:
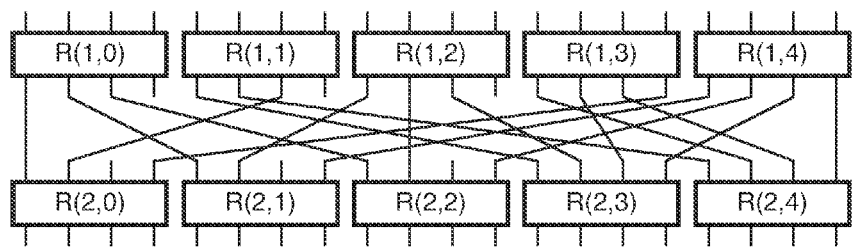

With top port 2 of R(2,4) selected and recalling that its corresponding port, bottom port 2 of R(1,3), is connected to top port 2 of R(2, 1), the process continues by diverting traffic from bottom port 2 of R(1,3) and top port 2 of R(2,1); stopping bottom port 2 of R(1,3) and top port 2 of R(2,1); disconnecting bottom port 2 of R(1,3) and top port 2 of R(2,1) and moving the disconnected connection to top port 2 of R(2,4) as shown in FIG. 4G; starting top port 2 of R(2,4) and bottom port 2 of R(1,3); and stop diverting the traffic from top port 2 of R(2,4) and bottom port 2 of R(1,3).

Figure 4H:
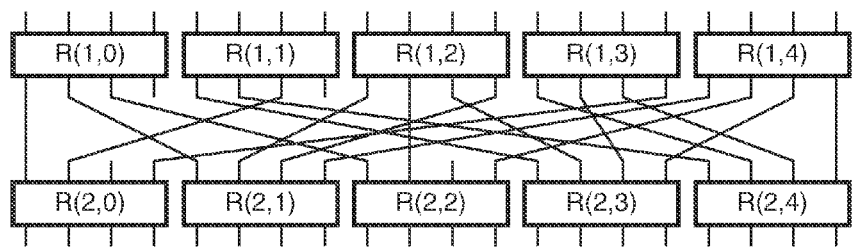

The process continues by selecting bottom port 3 of R(1,2) because scanning from right to left, it is the first port bottom or top not connected to anything and whose corresponding port (according to FIG. 3B) is also not connected to anything; establishing a new connection between bottom port 3 of R(1,2) and top port 2 of R(2,1) as shown in FIG. 4H; starting bottom port 3 of R(1,2) and top port 2 of R(2,1); and stop diverting the traffic from bottom port 3 of R(1,2) and top port 2 of R(2,1).

Scanning from right to left, no port, top or bottom, has a corresponding port which is not connected. Again, scanning from right to left, top port 2 of R(2,2) is not connected to anything with corresponding port according to FIG. 3B, bottom port 0 of R(1,3). Bottom port 0 of R(1,3) is currently connected to top port 1 of R(2,4). The breaking of this connection does not leave router R(1,3) or router R(2,4) with more than one broken connection. This completes the selection process for this step.

Figure 4I:
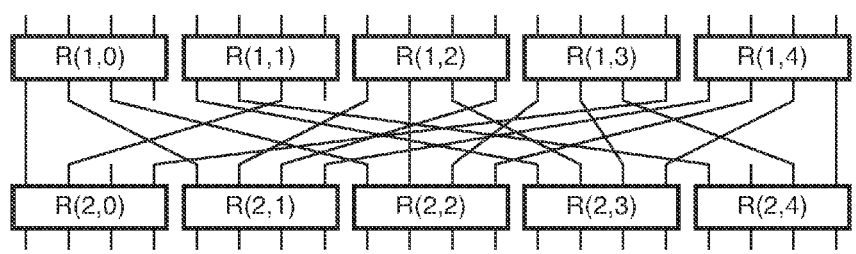

With top port 2 of R(2,2) selected and recalling that its corresponding port, bottom port 0 of R(1,3), is connected to top port 1 of R(2,4), the process continues by diverting traffic from bottom port 0 of R(1,3) and top port 1 of R(2,4); stopping bottom port 0 of R(1,3) and top port 1 of R(2,4); disconnecting bottom port 0 of R(1,3) and top port 1 of R(2,4) and moving the disconnected connection to top port 2 of R(2,2) as shown in FIG. 4I; starting top port 2 of R(2,2) and bottom port 0 of R(1,3); and stop diverting the traffic from top port 2 of R(2,2) and bottom port 0 of R(1,3).

Scanning from right to left, no port, top or bottom, has a corresponding port which is not connected. Again, scanning from right to left, top port 1 of R(2,4) is not connected to anything with corresponding port according to FIG. 3B, bottom port 1 of R(1,2). Bottom port 1 of R(1,2) is currently connected to top port 1 of R(2,2). The breaking of this connection does not leave router R(1,2) or router R(2,2) with more than one broken connection. This completes the selection process for this step.

Figure 4J:
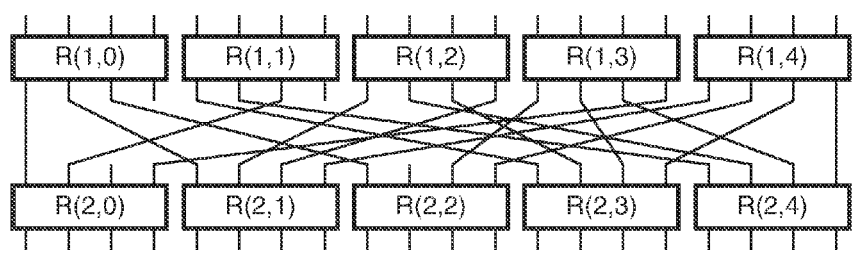

With top port 1 of R(2,4) selected and recalling that its corresponding port, bottom port 1 of R(1,2), is connected to top port 1 of R(2,2), the process continues by diverting traffic from bottom port 1 of R(1,2) and top port 1 of R(2,2); stopping bottom port 1 of R(1,2) and top port 1 of R(2,2); disconnecting bottom port 1 of R(1,2) and top port 1 of R(2,2) and moving the disconnected connection to top port 1 of R(2,4) as shown in FIG. 4J; starting top port 1 of R(2,4) and bottom port 1 of R(1,2); and stop diverting the traffic from top port 1 of R(2,4) and bottom port 1 of R(1,2).

Figure 4K:
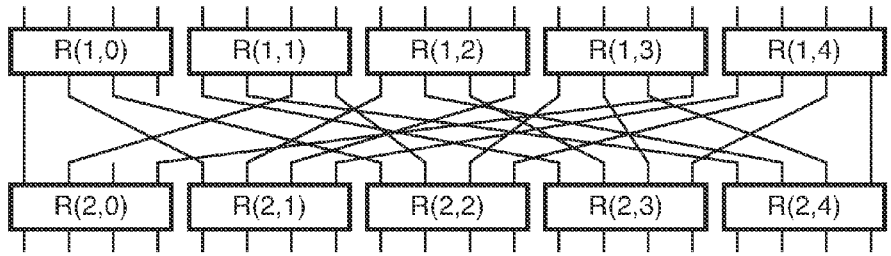

The process continues by selecting top port 1 of R(2,2) because scanning from right to left, it is the first port bottom or top not connected to anything and whose corresponding port (according to FIG. 3B) is also not connected to anything; establishing a new connection between top port 1 of R(2,2) and bottom port 3 of R(1, 1) as shown in FIG. 4K; starting top port 1 of R(2,2) and bottom port 3 of R(1,1); and stop diverting the traffic from top port 1 of R(2,2) and bottom port 3 of R(1,1).

Scanning from right to left, no port, top or bottom, has a corresponding port which is not connected. Again, scanning from right to left, bottom port 3 of R(1,0) is not connected to anything with corresponding port according to FIG. 3B, top port 0 of R(2,3). Top port 0 of R(2,3) is currently connected to bottom port 0 of R(1,1). The breaking of this connection does not leave router R(1,1) or router R(2,3) with more than one broken connection. This completes the selection process for this step.

Figure 4L:
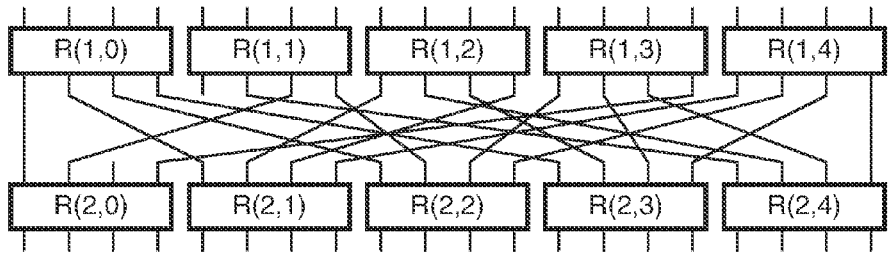

With bottom port 3 of R(1,0) selected and recalling that its corresponding port, top port 0 of R(2,3), is connected to bottom port 0 of R(1,1), the process continues by diverting traffic from top port 0 of R(2,3) and bottom port 0 of R(1,1); stopping top port 0 of R(2,3) and bottom port 0 of R(1,1); disconnecting top port 0 of R(2,3) and bottom port 0 of R(1,1) and moving the disconnected connection to bottom port 3 of R(1,0) as shown in FIG. 4L; starting bottom port 3 of R(1,0) and top port 0 of R(2,3); and stop diverting the traffic from bottom port 3 of R(1,0) and top port 0 of R(2,3).

Scanning from right to left, no port, top or bottom, has a corresponding port which is not connected. Again, scanning from right to left, bottom port 0 of R(1,1) is not connected to anything with corresponding port according to FIG. 3B, top port 0 of R(2,4). Top port 0 of R(2,4) is currently connected to bottom port 1 of R(1,1). The breaking this connection introduces a second broken connection to R(1,1), so bottom port 0 of R(1,1) is not selected. Continuing to scan from right to left, top port 2 of R(2,0) is not connected to anything with corresponding port according to FIG. 3B, bottom port 2 of R(1,2). Bottom port 2 of R(1,2) is currently connected to top port 1 of R(2,3). The breaking of this connection does not leave router R(1,2) or router R(2,3) with more than one broken connection. This completes the selection process for this step.

Figure 4M:
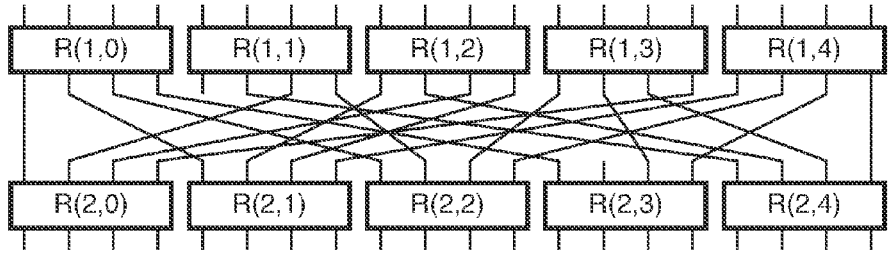

With top port 2 of R(2,0) selected and recalling that its corresponding port, bottom port 2 of R(1,2), is connected to top port 1 of R(2,3), the process continues by diverting traffic from bottom port 2 of R(1,2) and top port 1 of R(2,3); stopping bottom port 2 of R(1,2) and top port 1 of R(2,3); disconnecting bottom port 2 of R(1,2) and top port 1 of R(2,3) and moving the disconnected connection to top port 2 of R(2,0) as shown in FIG. 4M; starting top port 2 of R(2,0) and bottom port 2 of R(1,2); and stop diverting the traffic from top port 2 of R(2,0) and bottom port 2 of R(1,2).

Scanning from right to left, no port, top or bottom, has a corresponding port which is not connected. Again, scanning from right to left, top port 1 of R(2,3) is not connected to anything with corresponding port according to FIG. 3B, bottom port 0 of R(1,2). Bottom port 0 of R(1,2) is currently connected to top port 1 of R(2,1). The breaking of this connection does not leave router R(1,2) or router R(2, 1) with more than one broken connection. This completes the selection process for this step.

Figure 4N:
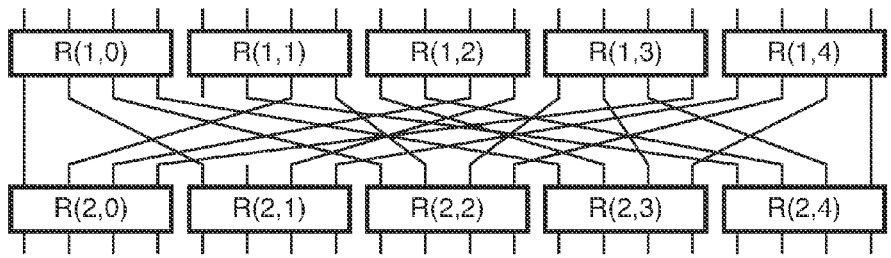

With top port 1 of R(2,3) selected and recalling that its corresponding port, bottom port 0 of R(1,2), is connected to top port 1 of R(2, 1), the process continues by diverting traffic from bottom port 0 of R(1,2) and top port 1 of R(2,1); stopping bottom port 0 of R(1,2) and top port 1 of R(2,1); disconnecting bottom port 0 of R(1,2) and top port 1 of R(2,1) and moving the disconnected connection to top port 1 of R(2,3) as shown in FIG. 4N; starting top port 1 of R(2,3) and bottom port 0 of R(1,2); and stop diverting the traffic from top port 1 of R(2,3) and bottom port 0 of R(1,2).

Scanning from right to left, no port, top or bottom, has a corresponding port which is not connected. Again, scanning from right to left, top port 1 of R(2, 1) is not connected to anything with corresponding port according to FIG. 3B, bottom port 2 of R(1, 1). Bottom port 2 of R(1, 1) is currently connected to top port 1 of R(2,0). The breaking this connection introduces a second broken connection to R(1,1), so top port 1 of R(2, 1) is not selected. Continuing to scan from right to left, bottom port 0 of R(1,1) is not connected to anything with corresponding port according to FIG. 3B, top port 0 of R(2,4). Top port 0 of R(2,4) is currently connected to bottom port 1 of R(1,1). The breaking this connection introduces a second broken connection to R(1,1), so bottom port 0 of R(1,1) is not selected. Since none of the ports that are not connected satisfy the second port selection criterion, the selection process continues by selecting the rightmost port not connected to anything, that is top port 1 of R(2, 1).

Figure 4O:
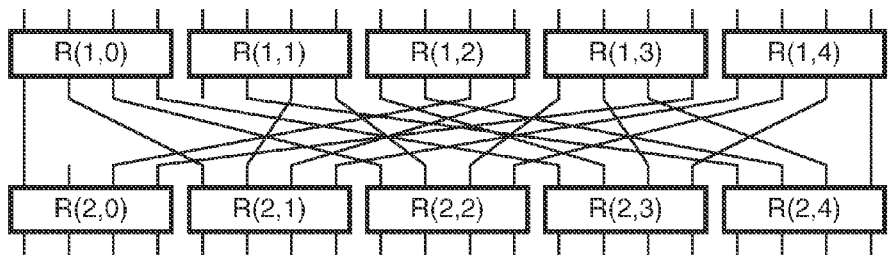

With top port 1 of R(2,1) selected and recalling that its corresponding port, bottom port 2 of R(1,1), is connected to top port 1 of R(2,0), the process continues by diverting traffic from bottom port 2 of R(1,1) and top port 1 of R(2,0); stopping bottom port 2 of R(1,1) and top port 1 of R(2,0); disconnecting bottom port 2 of R(1,1) and top port 1 of R(2,0) and moving the disconnected connection to top port 1 of R(2,1) as shown in FIG. 4O; starting top port 1 of R(2,1) and bottom port 2 of R(1,1); and stop diverting the traffic from top port 1 of R(2,1) and bottom port 2 of R(1,1).

Scanning from right to left, no port, top or bottom, has a corresponding port which is not connected. Again, scanning from right to left, bottom port 0 of R(1,1) is not connected to anything with corresponding port according to FIG. 3B, top port 0 of R(2,4). Top port 0 of R(2,4) is currently connected to bottom port 1 of R(1,1). The breaking this connection introduces a second broken connection to R(1,1), so bottom port 0 of R(1,1) is not selected. Continuing to scan from right to left, top port 1 of R(2,0) is not connected to anything with corresponding port according to FIG. 3B, bottom port 1 of R(1,1). Bottom port 1 of R(1,1) is currently connected to top port 0 of R(2,4). The breaking this connection introduces a second broken connection to R(1, 1), so top port 1 of R(2,0) is not selected. Since none of the ports that are not connected satisfy the second port selection criterion, the selection process continues by selecting the rightmost port not connected to anything, that is bottom port 0 of R(1, 1).

Figure 4P:
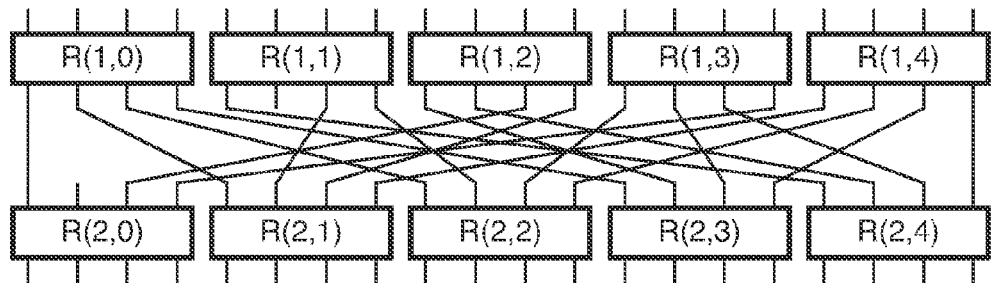

With bottom port 0 of R(1,1) selected and recalling that its corresponding port, top port 0 of R(2,4), is connected to bottom port 1 of R(1,1), the process continues by diverting traffic from top port 0 of R(2,4) and bottom port 1 of R(1,1); stopping top port 0 of R(2,4) and bottom port 1 of R(1,1); disconnecting top port 0 of R(2,4) and bottom port 1 of R(1,1) and moving the disconnected connection to bottom port 0 of R(1,1) as shown in FIG. 4P; starting bottom port 0 of R(1, 1) and top port 0 of R(2,4); and stop diverting the traffic from bottom port 0 of R(1, 1) and top port 0 of R(2,4).

Figure 4Q:
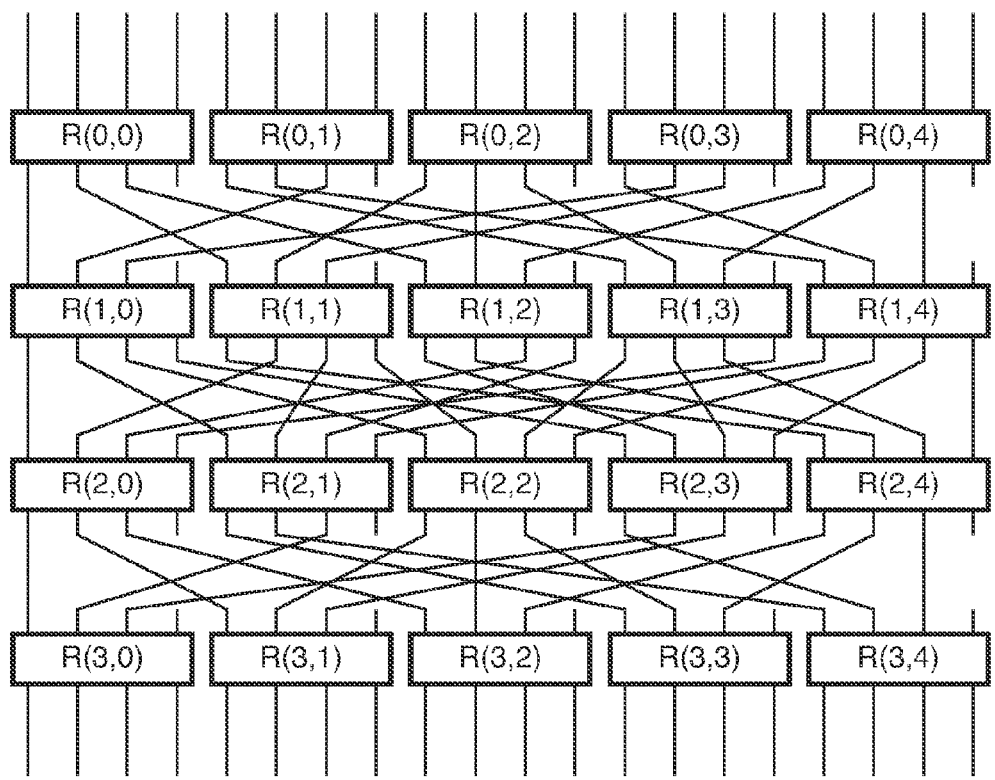
FIG. 4Q shows a partially upgraded 40 port multistage switching network with a completed rewire of the interconnections between router rows R(1,*) and R(2,*) adding a connection between bottom port 1 of R(1,1) and top port 1 of R(2,0).

The process continues by selecting bottom port 1 of R(1,1) because scanning from right to left, it is the first port bottom or top not connected to anything and whose corresponding port (according to FIG. 3B) is also not connected to anything; establishing a new connection between bottom port 1 of R(1,1) and top port 1 of R(2,0) as shown in FIG. 4Q; starting bottom port 1 of R(1,1) and top port 1 of R(2,0); and stop diverting the traffic from bottom port 1 of R(1,1) and top port 1 of R(2,0). This completes the rewiring of interconnection network 11, between row 1 and row 2.

Figure 5A:
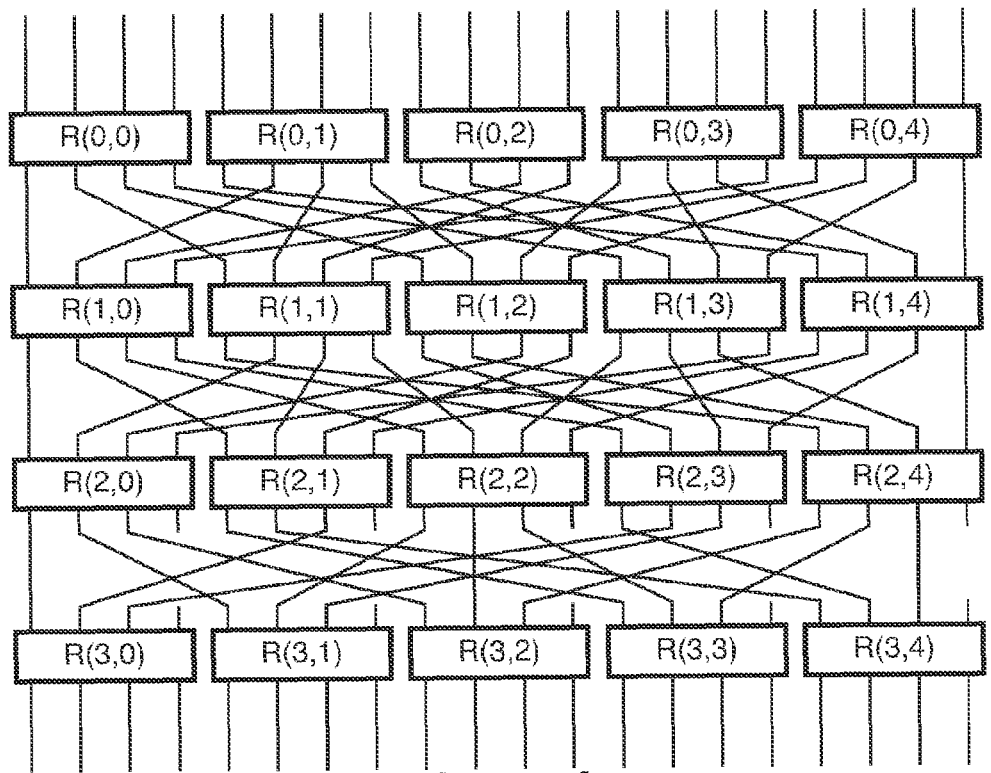
FIG. 5A shows a partially upgraded 40 port multistage switching network with a completed rewire of the interconnections between router rows R(0,*) and R(1,*).

According to the "row select" algorithm shown in FIG. 9A, interconnection network 10 should be rewired next. This is done by applying detailed rewiring just illustrated for interconnection network 11 to interconnection network 10. The results are shown in FIG. 5A.

Figure 5B:
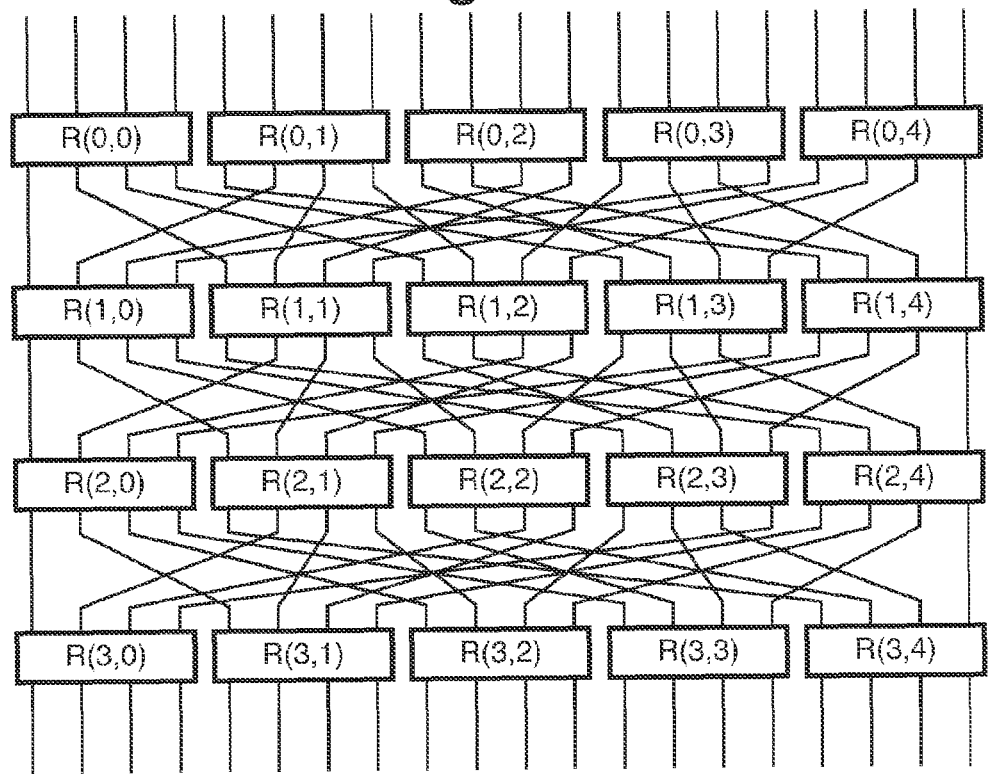
FIG. 5B shows a partially upgraded 40 port multistage switching network with a completed rewire of the interconnections between router rows R(2,*) and R(3,*).

Continuing, according to the "row select" algorithm shown in FIG. 9A, interconnection network 12 should be rewired next. This is done by applying detailed rewiring just illustrated for interconnection network 11 to interconnection network 12. The results are shown in FIG. 5B.

This completes rewiring phase. All that is needed to complete the fanout upgrade of the network shown in FIG. 3A is to connect and activate the external ports 13 and 14.

In a more sophisticated system, connections to ports on the same routers may be exchanged logically rather than physically. An example of such a swap is illustrated when interconnection network 11 of FIG. 3A is transformed into the interconnection network shown in FIG. 6A by swapping bottom port 0 and bottom port 1 of router R(1,1). This may be accomplished logically by permanently diverting the traffic intended for bottom port 0 of router R(1,1) to bottom port 1 of router R(1,1) and the traffic intended for bottom port 1 of router R(1,1) to bottom port 0 of router R(1,1). Even if such a logical exchange is not possible the ports may be in such physical proximity to each other that a physical swap can be made while minimizing the time which the disconnections occur resulting in very little impact on throughput bandwidth. In addition, only port exchanges are used here, but natural extensions to general port permutations may also be employed.

Again, rather than show a complete upgrade employing the relabel for the entire network, the upgrade and rewiring of interconnection network 11 of FIG. 3A (which is the same as interconnection networks 10, and 12 of FIG. 3A) is shown in great detail here. The detailed algorithm is given in FIG. 10 and flow chart FIG. 15. Though the relabeling algorithm shown here starts by scanning bottom ports and scanning them from left to right. Neither is necessary, top ports can be considered first and the order of scanning just needs to be systematic, a linear scan is the simplest.

Figure 6A:
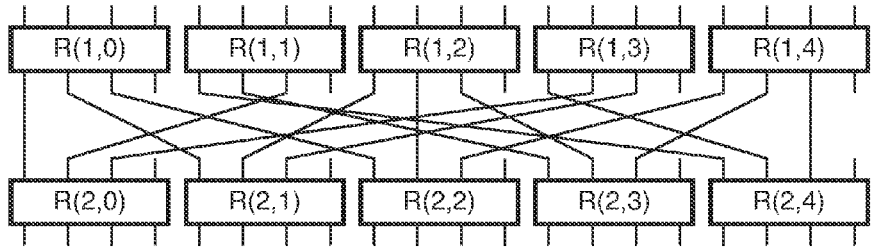
FIG. 6A, FIG. 6B, FIG. 6C, FIG. 6D, FIG. 6E, FIG. 6F, FIG. 6G, FIG. 6H, FIG. 6I, FIG. 6J, FIG. 6K, FIG. 6L, FIG. 6M, FIG. 6N, FIG. 6O, FIG. 6P, FIG. 6Q, FIG. 6R, FIG. 6S, FIG. 6T, FIG. 6U, FIG. 6V and FIG. 6W show the connections between router rows R(1,*) and R(2,*) being rewired in an alternate method into a 40 port RBCCG multistage switching network interconnection by an alternate method. First, by swapping bottom ports 1 and 0 of R(1,1); swapping bottom ports 2 and 1 of R(1,1); swapping bottom ports 0 and 3 of R(1,2); swapping bottom ports 2 and 0 of R(1,2); swapping bottom ports 0 and 2 of R(1,3); swapping bottom ports 1 and 3 of R(1,3); swapping bottom ports 0 and 1 of R(1,4); swapping bottom ports 0 and 2 of R(1,4); swapping bottom ports 0 and 3 of R(1,4); swapping top ports 2 and 3 of R(2,4); swapping top ports 1 and 2 of R(2,4); swapping top ports 2 and 3 of R(2,3); swapping top ports 2 and 3 of R(2,2); swapping top ports 1 and 2 of R(2,1); and finally, swapping top ports 2 and 3 of R(2,0), respectively. Second by adding a connection between bottom port 0 of R(1,4) and top port 3 of R(2,1); adding a connection between top port 2 of R(2,3) and bottom port 1 of R(1,3); adding a connection between bottom port 2 of R(1,2) and top port 2 of R(2,0); moving the connection from top port 1 of R(2,1) to top port 2 of R(2,2); moving the connection from top port 1 of R(2,2) to top port 1 of R(2,4); adding a connection between top port 1 of R(2,2) and bottom port 3 of R(1,1); moving the connection from top port 0 of R(2,3) to top port 1 of R(2,1)

The process begins by scanning bottom ports from left to right, R(1,1) is connected to R(2,4), but according to FIG. 3B, bottom port 0 should be connected to R(2,4) instead of bottom port 1. The connection to those ports are swapped as shown in FIG. 6A.

Figure 6B:
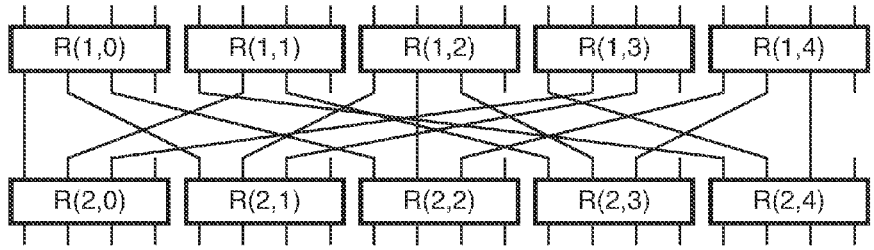

The process continues by scanning bottom ports from left to right, R(1,1) is connected to R(2,0), but according to FIG. 3B, bottom port 1 should be connected to R(2,0) instead of bottom port 2. The connection to those ports are swapped as shown in FIG. 6B.

Figure 6C:
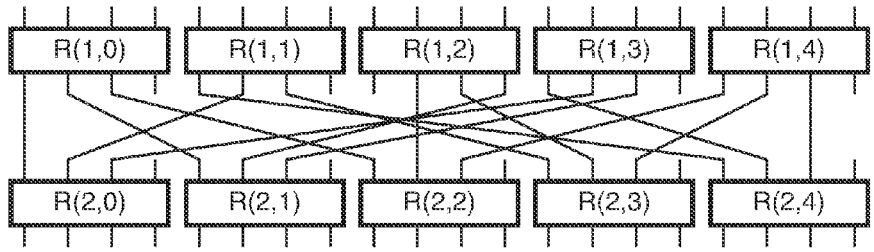

The process continues by scanning bottom ports from left to right, R(1,2) is connected to R(2,1), but according to FIG. 3B, bottom port 3 should be connected to R(2,1) instead of bottom port 0. The connection to those ports are swapped as shown in FIG. 6C.

Figure 6D:
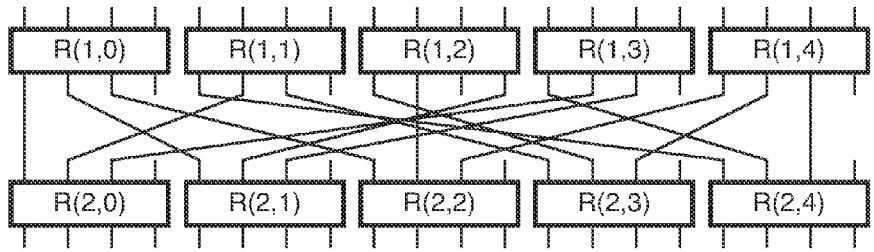

The process continues by scanning bottom ports from left to right, R(1,2) is connected to R(2,3), but according to FIG. 3B, bottom port 0 should be connected to R(2,3) instead of bottom port 2. The connection to those ports are swapped as shown in FIG. 6D.

Figure 6E:
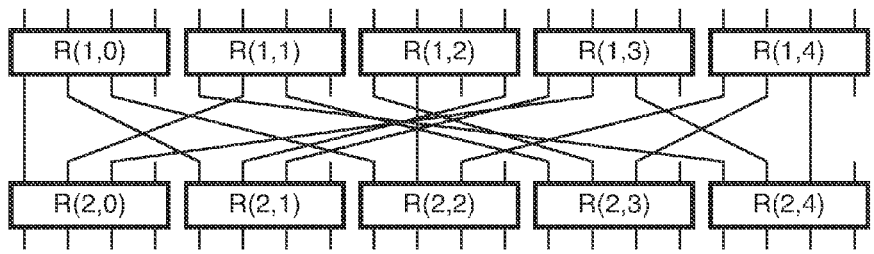

The process continues by scanning bottom ports from left to right, R(1,3) is connected to R(2,4), but according to FIG. 3B, bottom port 2 should be connected to R(2,4) instead of bottom port 0. The connection to those ports are swapped as shown in FIG. 6E.

Figure 6F:
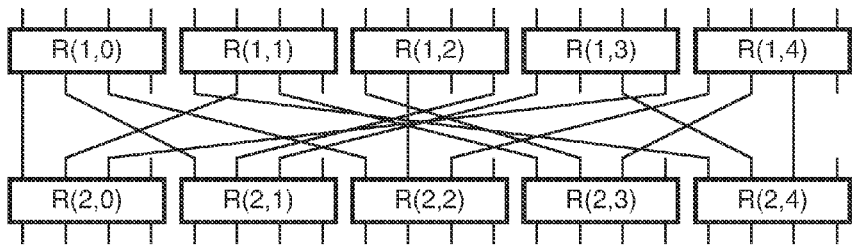

The process continues by scanning bottom ports from left to right, R(1,3) is connected to R(2,0), but according to FIG. 3B, bottom port 3 should be connected to R(2,0) instead of bottom port 1. The connection to those ports are swapped as shown in FIG. 6F.

Figure 6G:
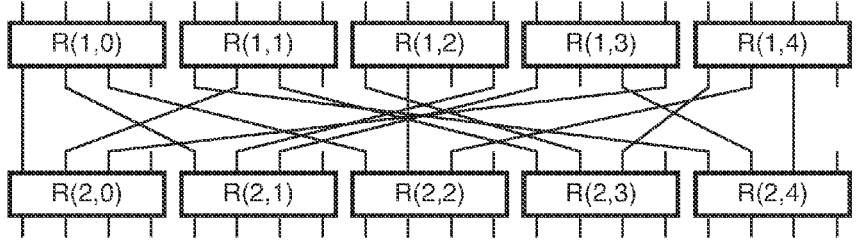

The process continues by scanning bottom ports from left to right, R(1,4) is connected to R(2,2), but according to FIG. 3B, bottom port 1 should be connected to R(2,2) instead of bottom port 0. The connection to those ports are swapped as shown in FIG. 6G.

Figure 6H:
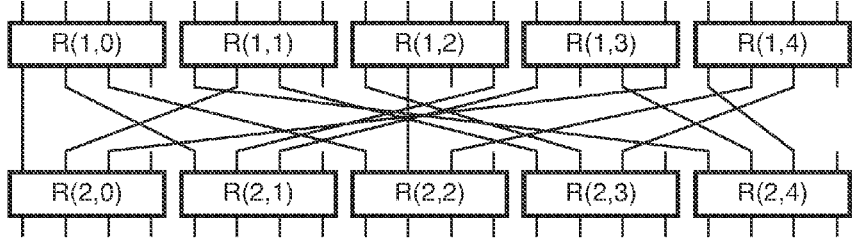

The process continues by scanning bottom ports from left to right, R(1,4) is connected to R(2,3), but according to FIG. 3B, bottom port 2 should be connected to R(2,3) instead of bottom port 0. The connection to those ports are swapped as shown in FIG. 6H.

Figure 6I:
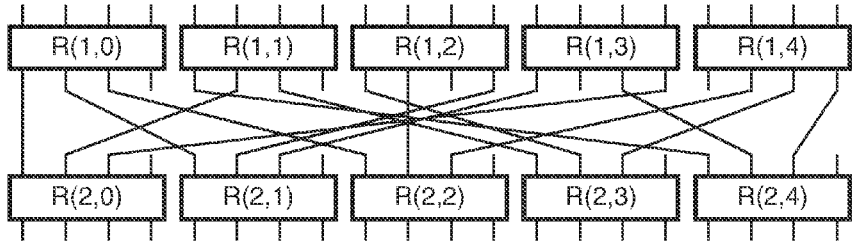

The process continues by scanning bottom ports from left to right, R(1,4) is connected to R(2,4), but according to FIG. 3B, bottom port 3 should be connected to R(2,4) instead of bottom port 0. The connection to those ports are swapped as shown in FIG. 6I.

Scanning from left to right all bottom ports that should be swapped are swapped. In this example, the next step occurs by scanning top ports now from right to left. The direction is not important, but is reversed here purely for aesthetic value. In fact, any systematic scan will work. Unlike the scanning of bottom ports, the top ports should be connected to the correct bottom port, not just the correct router.

Figure 6J:
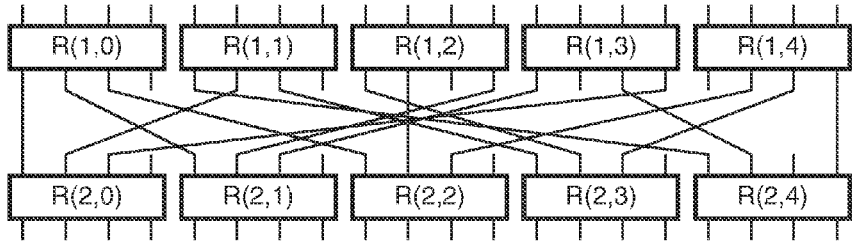

The process continues by scanning top ports from right to left, R(2,4) is connected to bottom port 3 of R(1,4), but according to FIG. 3B, top port 3 should be connected to bottom port 3 of R(1,4) instead of top port 2. The connection to those ports are swapped as shown in FIG. 6J.

Figure 6K:
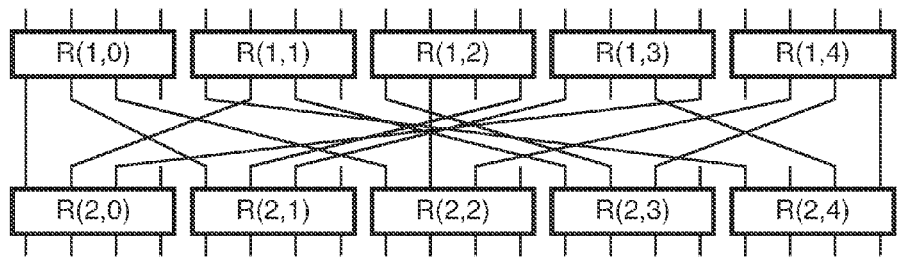

The process continues by scanning top ports from right to left, R(2,4) is connected to bottom port 2 of R(1,3), but according to FIG. 3B, top port 2 should be connected to bottom port 2 of R(1,3) instead of top port 1. The connection to those ports are swapped as shown in FIG. 6K.

Figure 6L:
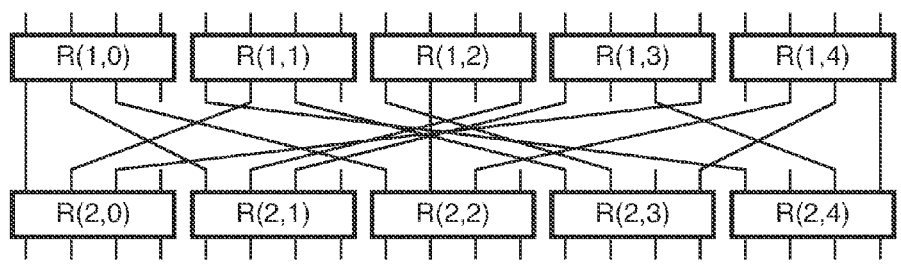

The process continues by scanning top ports from right to left, R(2,3) is connected to bottom port 2 of R(1,4), but according to FIG. 3B, top port 3 should be connected to bottom port 2 of R(1,4) instead of top port 2. The connection to those ports are swapped as shown in FIG. 6L.

Figure 6M:
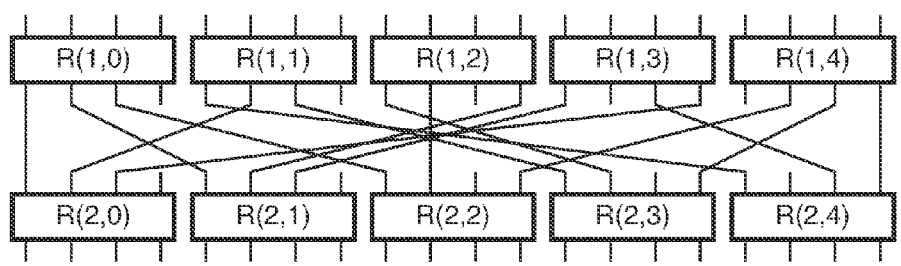

The process continues by scanning top ports from right to left, R(2,2) is connected to bottom port 1 of R(1,4), but according to FIG. 3B, top port 3 should be connected to bottom port 1 of R(1,4) instead of top port 2. The connection to those ports are swapped as shown in FIG. 6M.

Figure 6N:
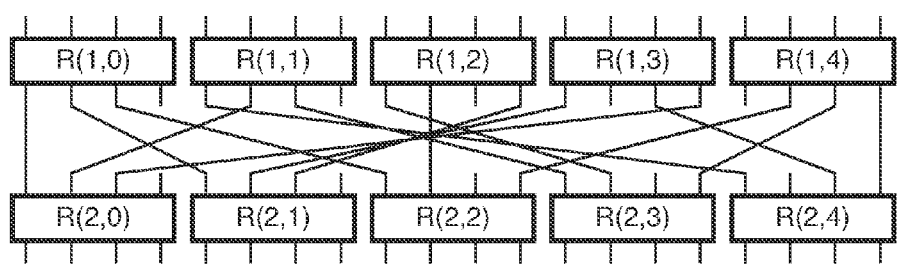

The process continues by scanning top ports from right to left, R(2,1) is connected to bottom port 3 of R(1,2), but according to FIG. 3B, top port 2 should be connected to bottom port 3 of R(1,2) instead of top port 1. The connection to those ports are swapped as shown in FIG. 6N.

Figure 6O:
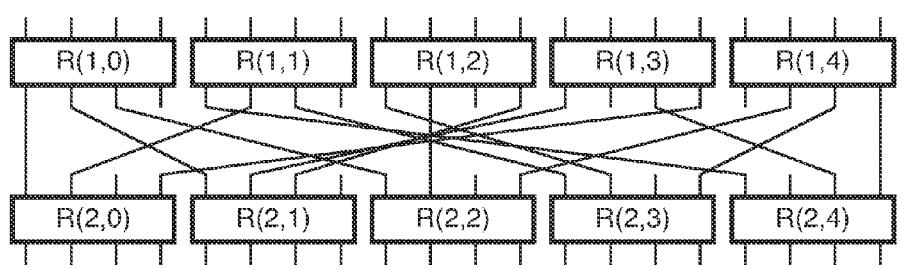

The process continues by scanning top ports from right to left, R(2,0) is connected to bottom port 3 of R(1,3), but according to FIG. 3B, top port 3 should be connected to bottom port 3 of R(1,3) instead of top port 2. The connection to those ports are swapped as shown in FIG. 6O.

This completes the scanning of the top ports, and the relabeling process. The process continues by employing the same "select_port" algorithm as in FIG. 9A as before.

Figure 6P:
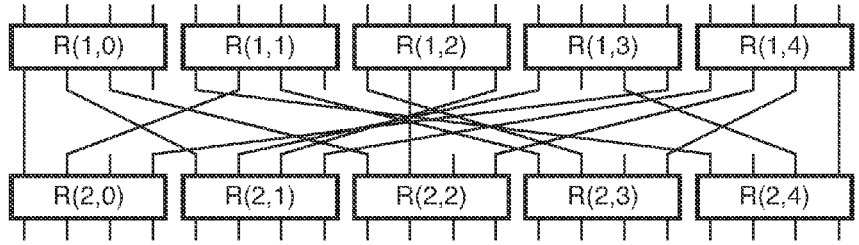

The process continues by selecting bottom port 0 of R(1,4) because scanning from right to left, it is the first port bottom or top not connected to anything and whose corresponding port (according to FIG. 3B) is also not connected to anything; establishing a new connection between bottom port 0 of R(1,4) and top port 3 of R(2,1) as shown in FIG. 6P; starting bottom port 0 of R(1,4) and top port 3 of R(2,1); and stop diverting the traffic from bottom port 0 of R(1,4) and top port 3 of R(2,1).

Figure 6Q:
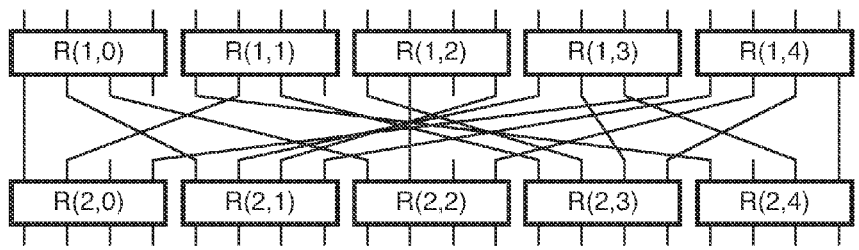

The process continues by selecting top port 2 of R(2,3) because scanning from right to left, it is the first port bottom or top not connected to anything and whose corresponding port (according to FIG. 3B) is also not connected to anything; establishing a new connection between top port 2 of R(2,3) and bottom port 1 of R(1,3) as shown in FIG. 6Q; starting top port 2 of R(2,3) and bottom port 1 of R(1,3); and stop diverting the traffic from top port 2 of R(2,3) and bottom port 1 of R(1,3).

Figure 6R:
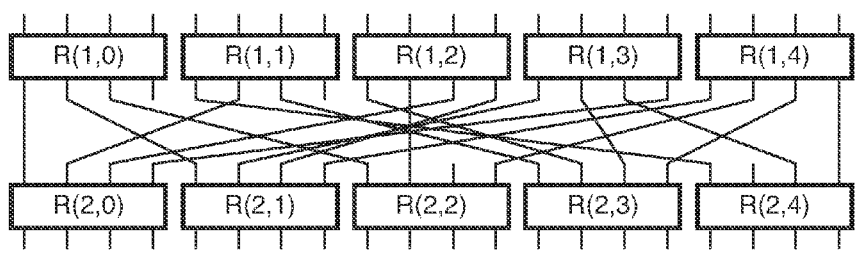

The process continues by selecting bottom port 2 of R(1,2) because scanning from right to left, it is the first port bottom or top not connected to anything and whose corresponding port (according to FIG. 3B) is also not connected to anything; establishing a new connection between bottom port 2 of R(1,2) and top port 2 of R(2,0) as shown in FIG. 6R; starting bottom port 2 of R(1,2) and top port 2 of R(2,0); and stop diverting the traffic from bottom port 2 of R(1,2) and top port 2 of R(2,0).

Scanning from right to left, no port, top or bottom, has a corresponding port which is not connected. Again, scanning from right to left, top port 1 of R(2,4) is not connected to anything with corresponding port according to FIG. 3B, bottom port 1 of R(1,2). Bottom port 1 of R(1,2) is currently connected to top port 1 of R(2,2). The breaking this connection introduces a second broken connection to R(2,2), so top port 1 of R(2,4) is not selected. Continuing to scan from right to left, top port 2 of R(2,2) is not connected to anything with corresponding port according to FIG. 3B, bottom port 0 of R(1,3). Bottom port 0 of R(1,3) is currently connected to top port 1 of R(2,1). The breaking of this connection does not leave router R(1,3) or router R(2, 1) with more than one broken connection. This completes the selection process for this step.

Figure 6S:
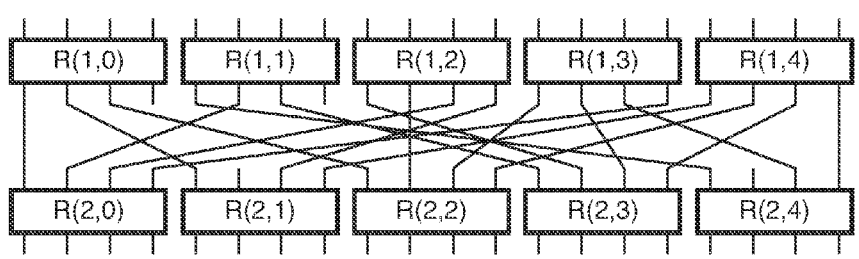

With top port 2 of R(2,2) selected and recalling that its corresponding port, bottom port 0 of R(1,3), is connected to top port 1 of R(2, 1), the process continues by diverting traffic from bottom port 0 of R(1,3) and top port 1 of R(2,1); stopping bottom port 0 of R(1,3) and top port 1 of R(2,1); disconnecting bottom port 0 of R(1,3) and top port 1 of R(2,1) and moving the disconnected connection to top port 2 of R(2,2) as shown in FIG. 6S; starting top port 2 of R(2,2) and bottom port 0 of R(1,3); and stop diverting the traffic from top port 2 of R(2,2) and bottom port 0 of R(1,3).

Scanning from right to left, no port, top or bottom, has a corresponding port which is not connected. Again, scanning from right to left, top port 1 of R(2,4) is not connected to anything with corresponding port according to FIG. 3B, bottom port 1 of R(1,2). Bottom port 1 of R(1,2) is currently connected to top port 1 of R(2,2). The breaking of this connection does not leave router R(1,2) or router R(2,2) with more than one broken connection. This completes the selection process for this step.

Figure 6T:
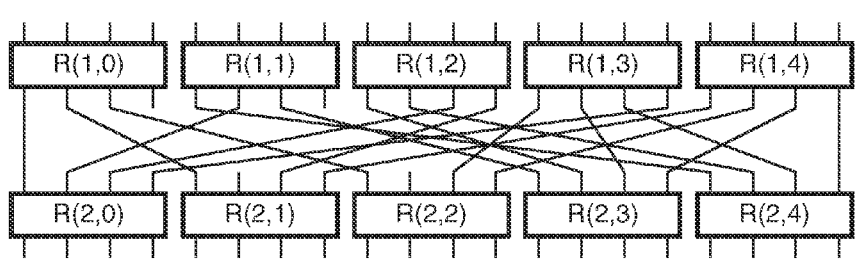

With top port 1 of R(2,4) selected and recalling that its corresponding port, bottom port 1 of R(1,2), is connected to top port 1 of R(2,2), the process continues by diverting traffic from bottom port 1 of R(1,2) and top port 1 of R(2,2); stopping bottom port 1 of R(1,2) and top port 1 of R(2,2); disconnecting bottom port 1 of R(1,2) and top port 1 of R(2,2) and moving the disconnected connection to top port 1 of R(2,4) as shown in FIG. 6T; starting top port 1 of R(2,4) and bottom port 1 of R(1,2); and stop diverting the traffic from top port 1 of R(2,4) and bottom port 1 of R(1,2).

Figure 6U:
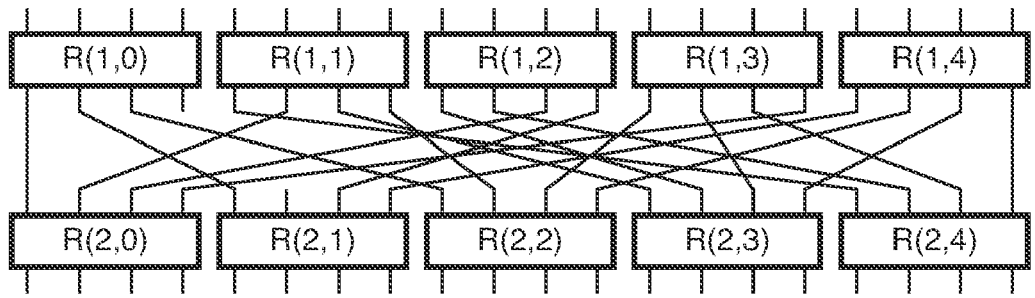

The process continues by selecting top port 1 of R(2,2) because scanning from right to left, it is the first port bottom or top not connected to anything and whose corresponding port (according to FIG. 3B) is also not connected to anything; establishing a new connection between top port 1 of R(2,2) and bottom port 3 of R(1,1) as shown in FIG. 6U; starting top port 1 of R(2,2) and bottom port 3 of R(1,1); and stop diverting the traffic from top port 1 of R(2,2) and bottom port 3 of R(1,1).

Scanning from right to left, no port, top or bottom, has a corresponding port which is not connected. Again, scanning from right to left, top port 1 of R(2, 1) is not connected to anything with corresponding port according to FIG. 3B, bottom port 2 of R(1, 1). Bottom port 2 of R(1, 1) is currently connected to top port 0 of R(2,3). The breaking of this connection does not leave router R(1, 1) or router R(2,3) with more than one broken connection. This completes the selection process for this step.

Figure 6V:
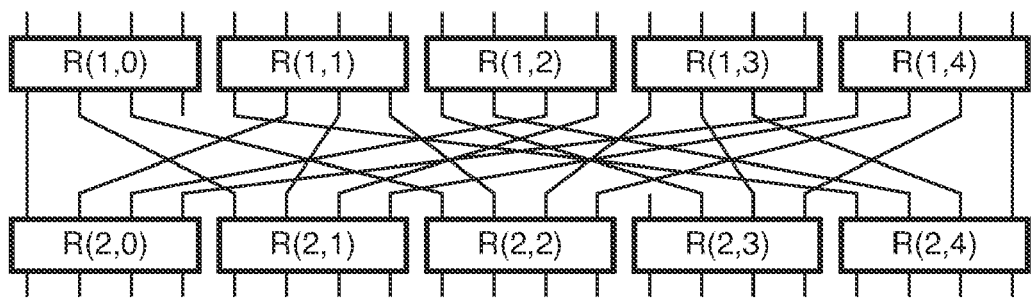

With top port 1 of R(2,1) selected and recalling that its corresponding port, bottom port 2 of R(1,1), is connected to top port 0 of R(2,3), the process continues by diverting traffic from bottom port 2 of R(1,1) and top port 0 of R(2,3); stopping bottom port 2 of R(1,1) and top port 0 of R(2,3); disconnecting bottom port 2 of R(1,1) and top port 0 of R(2,3) and moving the disconnected connection to top port 1 of R(2, 1) as shown in FIG. 6V; starting top port 1 of R(2,1) and bottom port 2 of R(1,1); and stop diverting the traffic from top port 1 of R(2,1) and bottom port 2 of R(1,1).

Figure 6W:
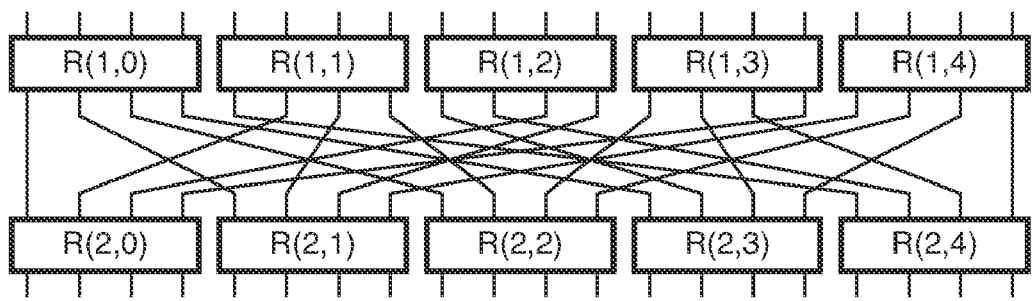

The process continues by selecting top port 0 of R(2,3) because scanning from right to left, it is the first port bottom or top not connected to anything and whose corresponding port (according to FIG. 3B) is also not connected to anything; establishing a new connection between top port 0 of R(2,3) and bottom port 3 of R(1,0) as shown in FIG. 6W; starting top port 0 of R(2,3) and bottom port 3 of R(1,0); and stop diverting the traffic from top port 0 of R(2,3) and bottom port 3 of R(1,0).

This completes the relabel and rewire phase applied to interconnection network 11 of FIG. 3A. In a complete upgrade, this algorithm could then be applied to interconnection network 10 of FIG. 3A, and finally interconnection network 12 of FIG. 3B in accordance with the first "row_select" algorithm of FIG. 8. After all the interconnection networks are completed, the upgrade is finished by connecting and activating external connections 13 and 14.

The process depicted in this application may be used also to reduce the fanout of routers in a network. Simply reverse the process shown here. In summary, the process would involve disconnecting external connections to ports to be removed; rewiring each interconnection network in the same manner as those described above; and finally removing the unwired ports.

Though this invention is applied to a RBCCG network composed of rows of routers of consistent number per row and fanout per router. It may be applied to fault tolerant networks composed of rows of routers of varying number per row and fanout per router where the rows are connected with interconnection networks of the same type as that used in a RBCCG network. It also applies to any multistage network which can be expanded by fanout since the action of adding ports induces fault tolerance. In addition, it is not restricted to routers and may be applied to networks composed of other types of switching elements.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

What is claimed is:

1. A method of upgrading a redundant multi-stage network comprising a plurality of rows, having a first row and a last row, each row comprising a plurality of routers, each router comprising a plurality of ports, said plurality of ports comprises top ports and bottom ports, wherein the top ports of the first row and the bottom ports of the last row are connected to external sources, said method comprising:
   adding a new top port and a new bottom port to each router in each row;
   providing a topology where the topology specifies for each port including the new top port and the new bottom port of each router of each row a corresponding port of a corresponding router to be connected, if said corresponding port exists;
   rewiring a selected port to be connected to the corresponding port of the corresponding router for said selected port, wherein the selected port is any port having a corresponding port of a corresponding router and is not connected to said corresponding port;
   repeating the rewiring until all the ports that have a corresponding port of a corresponding router are connected to said corresponding port;
   for each router in the first row, connecting the new top port to an external source;
   for each router in the last row, connecting the new bottom port to an external source;
   for each router in the first row, activating the new top port; and
   for each router in the last row, activating the new bottom port.

2. The method of claim 1, wherein each port comprises a label, said method further comprising permuting the labels of two or more ports of a selected router to reduce the number of ports which have to be rewired.

3. The method of claim 1, wherein the rewiring comprises:
   disconnecting any connection connected to the selected port;
   disconnecting any connection connected to the corresponding port of the corresponding router for the selected port; and
   connecting a connection between the selected port and the corresponding port.

4. The method of claim 1, wherein the rewiring a selected port comprises:
   deactivating the selected port;
   disconnecting any connection connected to the selected port;
   deactivating the corresponding port of the corresponding router for the selected port;
   disconnecting any connection connected to the corresponding port;
   connecting a connection between the selected port and the corresponding port;
   activating the selected port; and
   activating the corresponding port.

5. A method of upgrading a redundant multi-stage network comprising a plurality of rows, having a first row and a last row, each row comprising a plurality of routers, each router comprising a plurality of ports, said plurality of ports comprises top ports and bottom ports, wherein the top ports of the first row and the bottom ports of the last row are connected to external sources, said method comprising:
   adding a new top port and a new bottom port to each router in each row;
   providing a topology where the topology specifies for each port including the new top port and the new bottom port of each router of each row a corresponding port of a corresponding router to be connected, if said corresponding port exists;
   repeating an outer iteration for all rows from a row collection, wherein the row collection comprises all rows except the last row from the plurality of rows, said outer iteration comprising:
      selecting a selected row from all previously unselected rows in the row collection, wherein the selected row is connected to an adjacent row below the selected row by an interconnection network where bottom ports of routers in the selected row are connected to top ports of routers in the adjacent row; and
      repeating an inner iteration until each bottom ports of all routers in the selected row are connected to the corresponding port of said bottom port, said inner iteration comprising:
         selecting a selected port from a port collection comprising all bottom ports of all routers in the selected row and all top ports of all routers of the adjacent row that have a corresponding port and are not connected to said corresponding port; and
         rewiring the selected port to be connected the corresponding port of the corresponding router for said selected port;
   for each router in the first row, connecting the new top port to an external source;
   for each router in the last row, connecting the new bottom port to an external source;
   for each router in the first row, activating the new top port; and
   for each router in the last row, activating the new bottom port.

6. The method of claim 5, wherein the rewiring comprises:
   disconnecting any connection connected to the selected port;
   disconnecting any connection connected to the corresponding port of the corresponding router for the selected port and;

connecting a connection between the selected port and the corresponding port.

7. The method of claim 5, wherein the rewiring comprises:
deactivating the selected port;
disconnecting any connection connected to the selected port;
deactivating the corresponding port of the corresponding router for the selected port;
disconnecting any connection connected to the corresponding port;
connecting a connection between the selected port and the corresponding port;
activating the selected port; and
activating the corresponding port.

8. The method of claim 5, wherein selecting the a selected row comprises:
picking as the selected row, a row within the row collection which is closest to the middle of the redundant multistage network and previously unselected.

9. The method of claim 5, wherein the inner iteration further comprises:
repeating a first relabeling iteration until there are no routers having a first bottom port and a second bottom port, such that the first bottom port is connected to any port of the corresponding router for the second bottom port, said first relabeling iteration comprises:
selecting a selected router in the selected row having a third bottom port and a fourth bottom port in a plurality of bottom ports comprising all bottom ports in the port collection, wherein the third bottom port is connected to any port of the corresponding router for the fourth bottom port; and
exchanging the label of the third bottom port and label of the fourth bottom port.

10. The method of claim 9, wherein the inner iteration further comprises:
repeating a second relabeling iteration until there are no routers having a fifth bottom port and a sixth bottom port, such that the fifth bottom port is connected to the corresponding port of the corresponding router for the sixth bottom port, said second relabeling iteration comprising:
selecting a selected router in the adjacent row having a seventh top port and a eighth top port in a plurality of top ports, comprising all top ports in the port collection, wherein the seventh top port is connected to the corresponding port of the corresponding router for the eighth top port; and
exchanging the label of the seventh bottom port and label of the eighth bottom port.

11. The method of claim 5, wherein selecting a selected port comprises:
if a disconnected port exists in the port collection, selecting said disconnected port as the selected port.

12. The method of claim 5, wherein selecting a selected port comprises:
if a disconnected port exists in the port collection, wherein the corresponding port of the corresponding router for the disconnected port is not connected, selecting said disconnected port as the selected port.

13. The method of claim 5, wherein selecting a selected port comprises:
if a disconnected port exists in the port collection, wherein all ports of a router connected to the corresponding port of the corresponding router for the disconnected port are connected, selecting said disconnected port as the selected port.

14. The method of claim 5, wherein selecting a selected port comprises:
a) if a first disconnected port exists in the port collection, selecting said first disconnected port as the selected port, wherein the corresponding port of the corresponding router for the first disconnected port is not connected;
b) if no port was selected as the selected port in step a) and a second disconnected port exists in the port collection, selecting said second disconnected port as the selected port, wherein all ports of a router connected to the corresponding port of the corresponding router for the second disconnected port are connected;
c) if no port was selected as the selected port in step a) or b) and if a third disconnected port exists in the port collection, selecting said third disconnected port as the selected port, wherein the third disconnected port is not connected; and
if no port was selected as the selected port in step a), b) or c), selecting any port in the port collection as the selected port.

15. The method of claim 5, wherein selecting a selected port comprises:
if a previously disconnected port exists in the port collection, selecting said previously disconnected port as the selected port, otherwise picking any port in the port collection as the selected port, wherein the previously disconnected port was disconnected in a previous iteration of the selecting a selected port.

16. The method of claim 5, further comprising:
providing a port fifo,
and wherein selecting a selected port comprises:
a) if the port fifo is empty, adding to the port fifo all ports in the port collection which are not connected;
b) if no ports are added to the port fifo in step a), selecting as the selected port any port in the port collection; and
if no port was selected as the selected port in step b), selecting as the selected port, a next port in the port fifo.

17. A method of downgrading redundant multi-stage network comprising a plurality of rows, having a first row and a last row, each row comprising a plurality of routers, each router comprising a plurality of ports, said plurality of ports comprises top ports and bottom ports, wherein the top ports of the first row and the bottom ports of the last row are connected to external sources, comprising:
for each router in all rows, selecting a selected top port and a selected bottom port;
providing a topology where the topology specifies for each port of each router of each row a corresponding port of a corresponding router to be connected, if said corresponding port exists, wherein none of the selected top ports and selected bottom ports have a corresponding port;
for each router in the first row, deactivating the selected top port;
for each router in the first row, deactivating the selected bottom ports;
for each router in the first row, disconnecting the selected top port from external sources;
for each router in the last row, disconnecting the selected bottom port from external sources;

rewiring a selected port to be connected to the corresponding port of the corresponding router for said selected port, wherein the selected port is any port having a corresponding port of a corresponding router and is not connected to said corresponding port; and repeating the rewiring until all the ports that have a corresponding port of the corresponding router are connected to said corresponding port.

18. The method of claim 17, further comprising removing all selected top ports and all selected bottom ports from each router.

19. The method of claim 17, wherein each port comprises a label, said method further comprising permuting the labels of two or more ports of a selected router to reduce the number of ports which have to be rewired.

* * * * *